US012643109B1

(12) United States Patent
Stueber

(10) Patent No.: US 12,643,109 B1
(45) Date of Patent: Jun. 2, 2026

(54) ARTICULATABLE LIQUID HANDLER RACK SYSTEM

(71) Applicant: Ryan Lee Stueber, Lake Forest, CA (US)

(72) Inventor: Ryan Lee Stueber, Lake Forest, CA (US)

( * ) Notice: Subject to any disclaimer, the term of this patent is extended or adjusted under 35 U.S.C. 154(b) by 0 days.

(21) Appl. No.: 19/405,026

(22) Filed: Dec. 1, 2025

(51) Int. Cl.
*B01L 9/06* (2006.01)

(52) U.S. Cl.
CPC ........... *B01L 9/06* (2013.01); *B01L 2200/022* (2013.01); *B01L 2200/028* (2013.01); *B01L 2300/0609* (2013.01)

(58) Field of Classification Search
CPC ................. B01L 9/06; B01L 2200/022; B01L 2200/028; B01L 2300/0609
See application file for complete search history.

(56) References Cited

U.S. PATENT DOCUMENTS 3,348,658 A 10/1967 Cannon
3,538,962 A 11/1970 Gilson
3,788,450 A 1/1974 Tschunt
6,001,310 A 12/1999 Shaffer
8,221,300 B2 7/2012 Sherman
9,423,409 B2 8/2016 Friedman
D770,058 S 10/2016 Sharpe
2016/0116386 A1* 4/2016 Puig ........................ B03C 1/288 422/527
2017/0341080 A1* 11/2017 Kamees .................... B01L 9/06

FOREIGN PATENT DOCUMENTS

CN 205667864 U 11/2016

* cited by examiner

*Primary Examiner* — Jennifer Wecker
*Assistant Examiner* — Jonathan Bortoli
(74) *Attorney, Agent, or Firm* — DANE IP Law PC

(57) ABSTRACT

A liquid handler rack system for test tubes includes a base assembly mounted on a platform. Racks are configured for loading onto the base assembly. An articulatable test tube holder assembly includes test tube holder modules. Each test tube holder module includes a casing with a compartment for receiving a test tube and hinges on opposite sides of the casing. The test tube holder modules are coupled together by the hinges which are configured to allow the test tube holder modules to rotate relative to each other. The articulatable test tube holder assembly is configured to be bent and shaped to conform to different equipment configurations. The test tube holder modules detain the test tubes with a ferrous element attracting to metal inserts in the racks. A magnet is housed by the test tube holder module and positioned to hold the test tube in the compartment.

23 Claims, 30 Drawing Sheets

ARTICULATABLE LIQUID HANDLER RACK SYSTEM

CROSS-REFERENCE TO RELATED APPLICATIONS

None.

FIELD OF INVENTION

The present disclosure relates to laboratory equipment for handling liquid samples, and more particularly to an articulatable liquid handler rack system.

BACKGROUND

Laboratory automation has become increasingly prevalent in modern research and clinical environments, where efficient handling of liquid samples is fundamental to numerous analytical processes. Liquid handlers and centrifuges are commonly used instruments that require precise positioning and organization of sample containers, such as test tubes, tubes, and other vessels, to ensure accurate and reproducible results.

Traditional rack systems for holding sample containers in laboratory equipment typically have configurations that are designed for specific instrument geometries. These conventional systems often utilize sample holders that cannot be easily transferred or reconfigured for different commonly used instruments or steps found in most sample processing methods.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a liquid handler rack system for a plurality of test tubes is provided. The system includes a base assembly mounted on a platform. A plurality of racks are configured to be loaded onto the base assembly. An articulatable test tube holder assembly includes a plurality of test tube holder modules. Each test tube holder module includes a casing defining a compartment for receiving a test tube and a plurality of hinges on opposite sides of the casing. The test tube holder modules are coupled together by the hinges and the hinges are configured to allow the test tube holder modules to rotate relative to each other. The articulatable test tube holder assembly is configured to be bent and shaped to conform to different equipment configurations.

According to other aspects of the present disclosure, a test tube holder module for use in a liquid handler rack system is provided. The test tube holder module includes a casing having a front side and an open backside. The front side of the casing includes a viewing window. A compartment is defined within the casing for receiving a test tube. A pair of clamp edges define the open backside of the casing to allow test tube insertion into the compartment. A leaf spring projects into the window and is positioned to retain a test tube within the casing. A magnet seat is at a bottom of the compartment. A magnet is positioned within the magnet seat. A magnet cap retains the magnet within the magnet seat and provides a platform surface for test tube support. Hinge elements are on sidewalls of the casing configured to couple with adjacent test tube holder modules to allow rotation relative to the adjacent test tube holder modules.

According to another aspect, a test tube holder assembly for liquid handler rack systems is provided. The assembly includes a grating including a plurality of prongs. A rack includes a platform, a retaining wall coupled to the platform, and a plurality of openings at a base of the retaining wall, configured to receive the plurality of prongs and position the prongs on the platform. The assembly further includes a plurality of test tube holder modules configured to detain a test tube. The test tube holder modules include a casing, a compartment in the casing for receiving the test tube, a magnet housed by the casing and positioned in attraction to one of the prongs to hold the test tube holder module in place on the rack platform, and a plurality of connection elements coupling the plurality of test tube holder modules together.

The foregoing general description of the illustrative aspects and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The present disclosure relates to an articulatable liquid handler rack system designed for handling a plurality of test tubes in laboratory environments. The system provides a flexible and adaptable solution for organizing and processing test tubes in various types of equipment, including liquid handlers and centrifuges. The articulatable nature of the system allows the rack assembly to be bent and shaped to conform to different equipment configurations and spatial constraints so that the test tubes and articulable liquid handler rack can be configured to fit into a centrifuge holder easily and quickly without having to remove each test tube individually by hand.

The system addresses the challenge of efficiently managing multiple test tubes in laboratory settings where different types of processing equipment may have varying geometric requirements. In some cases, laboratory workflows involve transferring test tubes between different pieces of equipment that may have linear, circular, or other specialized configurations. The articulatable design enables a single rack system to accommodate these diverse requirements without the need for multiple specialized rack types.

The adaptability of the system extends to its compatibility with different centrifuge bucket configurations. In some cases, the system may be configured to fit within circular centrifuge buckets where the articulatable assembly wraps into a spiral formation. In other cases, the system may be arranged in a switchback pattern to accommodate rectangular centrifuge bucket designs, often called an SDS-16 or 96-well plate format. This versatility allows laboratories to standardize on a single rack system while maintaining compatibility with various types of centrifuge equipment.

The modular construction of the system facilitates both assembly and maintenance operations. Individual components may be replaced or reconfigured as needed without requiring replacement of the entire system. The articulatable connections between components allow for smooth transitions and movements during operation while maintaining secure retention of test tubes throughout the process. This design approach balances the competing requirements of flexibility and stability that are encountered in high-throughput laboratory environments, while vastly reducing ergonomic strain associated with transferring test tubes between various instruments and workspaces.

The system incorporates features that enhance both usability and reliability in laboratory settings. The design accommodates standard 12×75 mm test tubes, with or without an adhesive label applied, and provides secure retention mechanisms to prevent test tube displacement during operation. The articulatable joints allow the system to conform to curved paths while maintaining proper test tube orientation, order, and accessibility for automated liquid handling equipment or manual operations.

System

Figure 1:
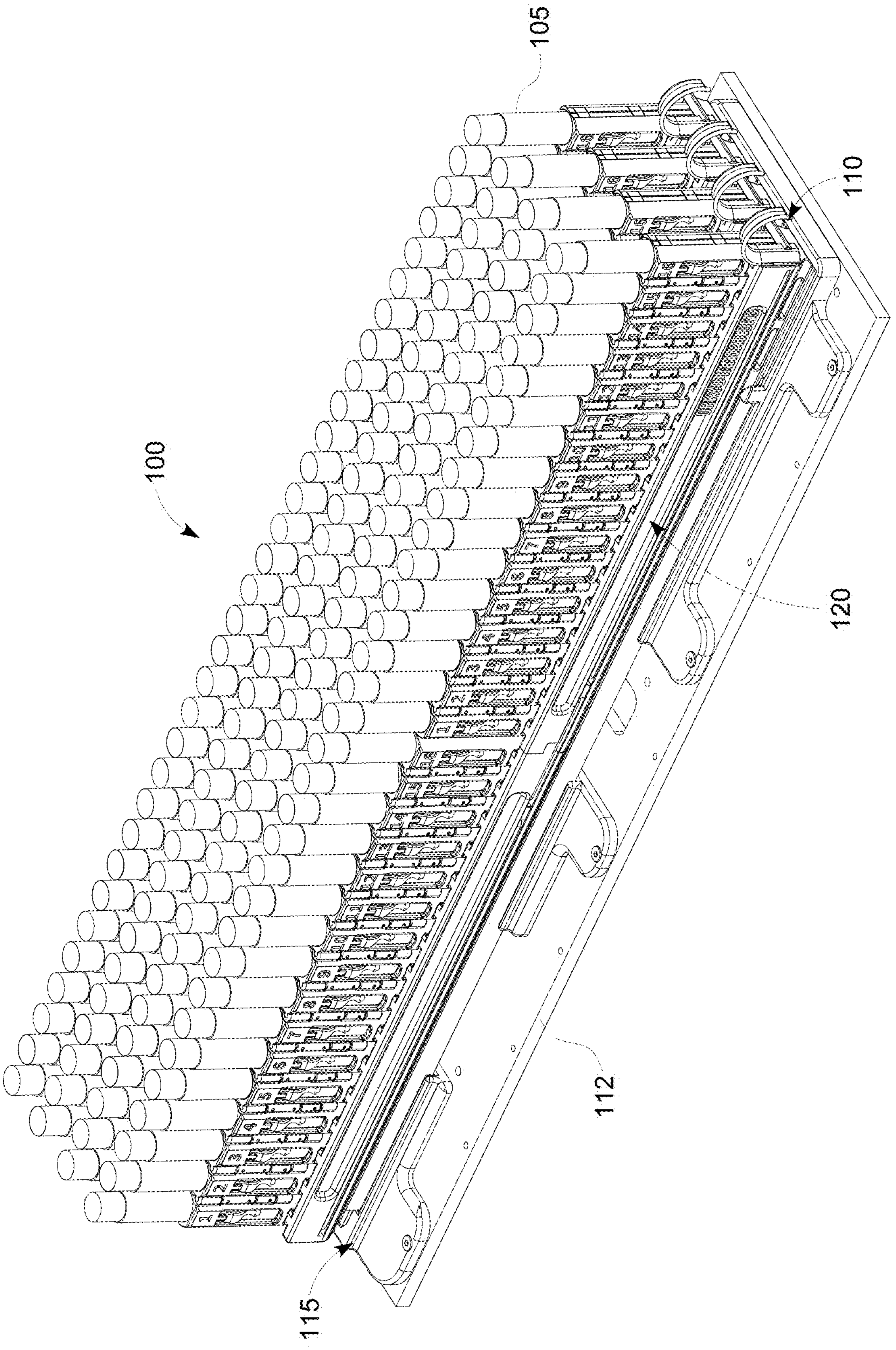
FIG. 1 is an isometric view of a liquid handler rack system according to an aspect of the subject technology.

Referring now to FIGS. 1-6, a liquid handler rack system 100 (referred to sometimes as the "system 100" for brevity) is shown for carrying a plurality of test tubes 105. As shown in FIG. 1, the system 100 includes a plurality of modular racks 120 (see also FIG. 13) with a configuration that facilitates assembly, maintenance, and customization for different laboratory applications. The racks 120 may each carry an articulatable test tube holder assembly 110 (see FIG. 20) configured to hold a plurality of the test tubes 105. The racks 120 may be configured to slide in and out from a base assembly 115. The base assembly 115 includes a platform 112 onto which the racks 120 may be individually coupled and removed from.

Figure 2:
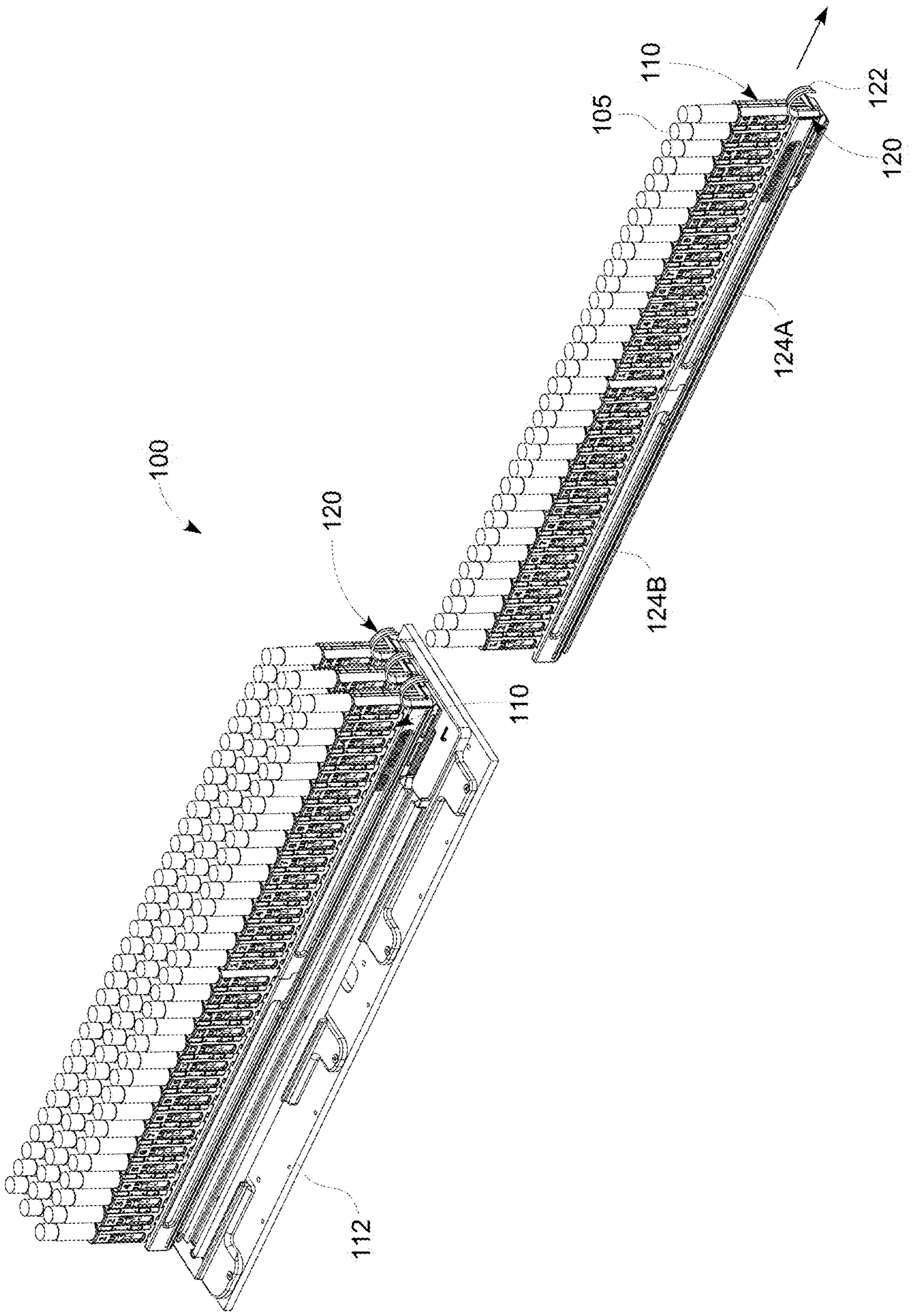
FIG. 2 is an isometric view of the system of FIG. 1 with a rack assembly exploded from the system.

FIG. 2 shows one of racks 120 removed from its retention on the base assembly 115. The coupling mechanism that retains the rack 120 onto the platform 112 is exposed. In the example shown, coupling may be provided by a rail system that allows the rack 120 to be slid into and out from the platform 112. The racks 120 may include a handle 122 at their front end that may be used to grasp an individual rack 120 for pulling the rack 120 from the platform 112 or sliding the rack 120 back onto the platform 112. Each rack 120 may be constructed from two primary sections that can be joined together to form a complete rack assembly. The rack front half 124A and rack back half 124B may be configured as separate components and subsequently coupled together during assembly. This two-piece construction approach allows for efficient manufacturing processes and enables replacement of individual sections. The modular design also accommodates variations in rack length and configuration by allowing different combinations of lengths of front and back sections to be assembled together.

Figure 3:
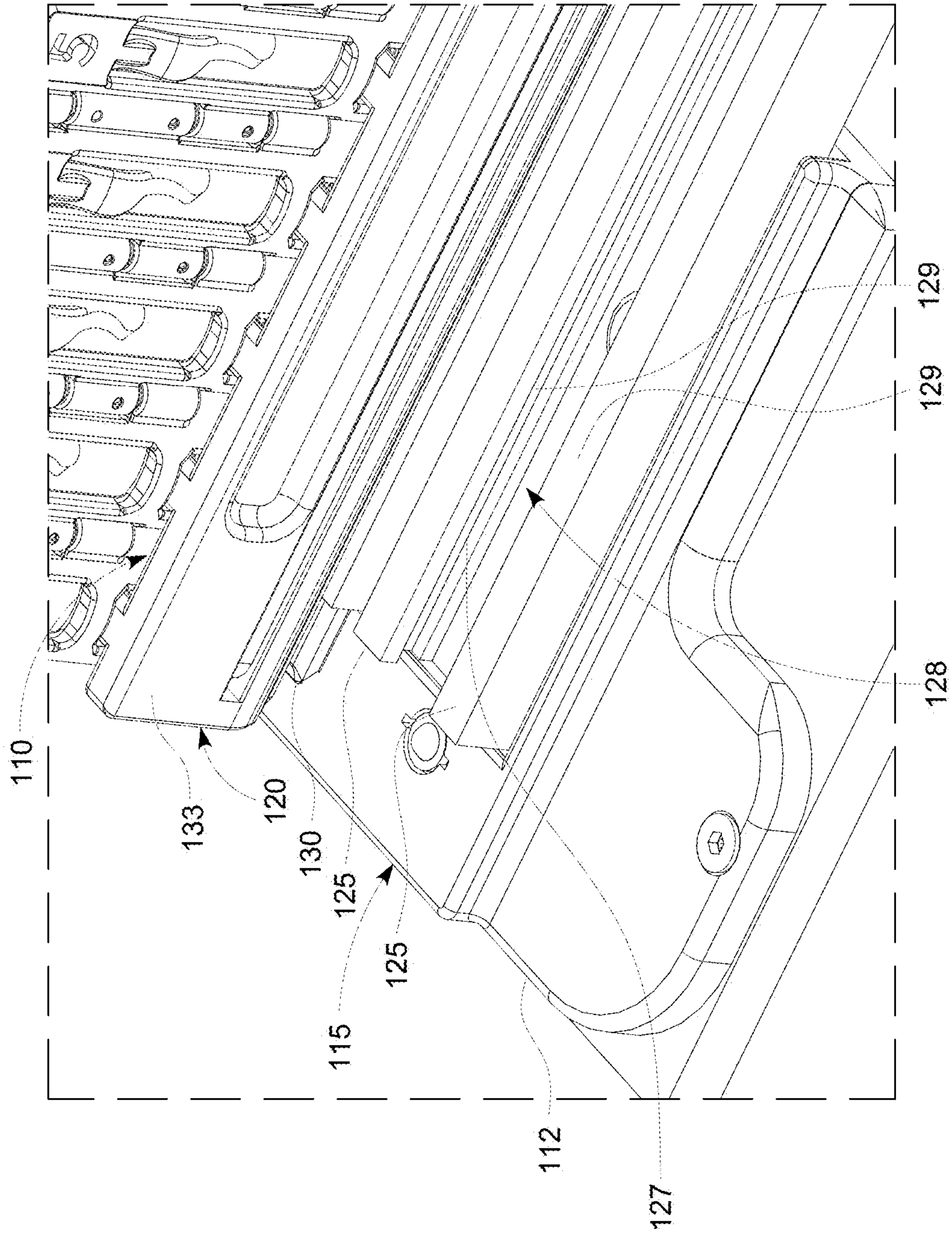
FIG. 3 is an enlarged view of a section of the system of FIG. 2.
Figure 4:
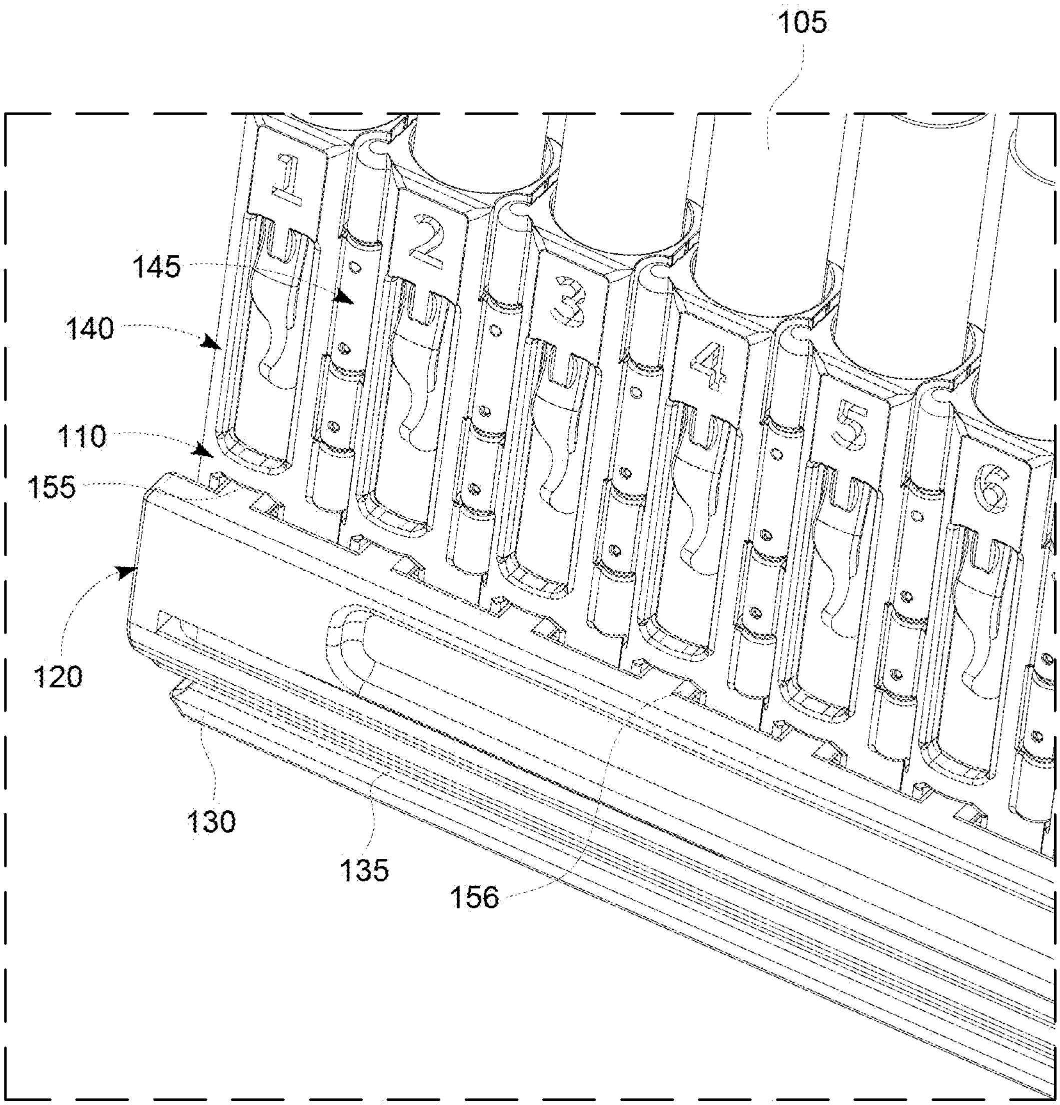
FIG. 4 is an enlarged perspective view of an end of a test tube holder module assembly mounted to a rack, according to an aspect.
Figure 5:
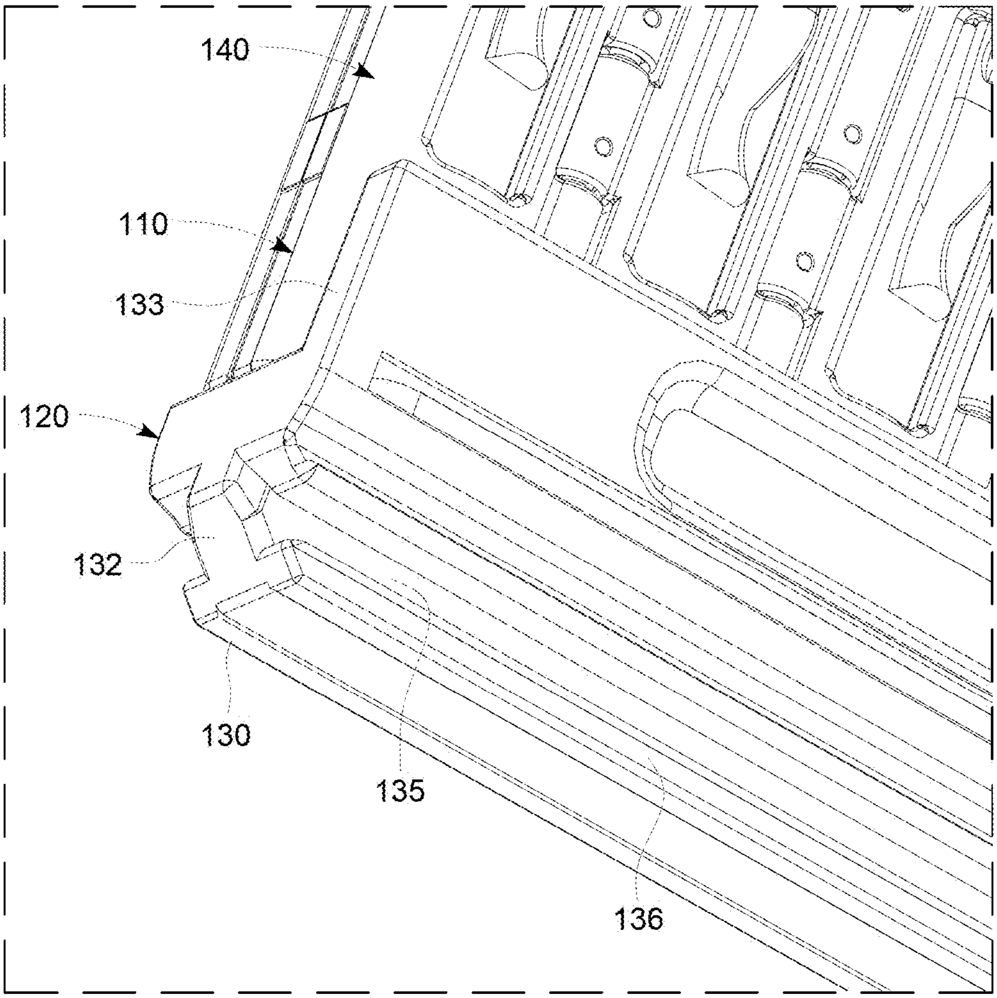
FIG. 5 is an enlarged bottom perspective view of the end of the rack and test tube holder assembly of FIG. 4.

FIGS. 3-5 show an enlarged view of the rack 120, and in particular, elements that cooperate to provide the sliding coupling of the rack 120 to the platform 112. The rack 120 may include a retaining wall 133 that extends upward from a base section. The retaining wall 133 is positioned to help stabilize the articulatable test tube holder assembly 110 onto the rack 120 which is primarily held in place by the magnets 150 (FIG. 21A) of the test tube holder module 140 interacting with the steel prongs 170 inserted in rack 120.

The rack 120 may include a rack rail 130 and associated channel systems that provide the primary interface mechanism for connecting individual racks 120 to the base assembly 115. The rail 130 and channel 125 interface allows racks 120 to be easily inserted into and removed from the base assembly 115 while maintaining proper alignment and support during operation. The articulatable test tube holder assembly 110 may be removed from and inserted into the rack 120 as a complete unit, allowing for efficient loading and unloading operations in laboratory workflows.

The platform 112 may include a plurality of base rails 125. For each rack 120, there may be a pair of base rails 125 that are spaced from each other by a channel 128. The base rails 125 may include a base rail flange 129 that projects inward toward an opposing flange 129 of a rail pair. The internal sidewalls of a base rail 125 may include a groove 127. Below the retaining wall 133, the rack 120 may include at its base section a rack rail 130 configured to slide within the groove 127. In one aspect, the rack rail 130 is configured to be a tongue and groove securing element. The rack rail 130 may include a rail tongue 136 that is configured to slide within the grooves 127 of the rack 120. The rack rail 130 may include a channel 135 between the retaining wall 130 and the tongue 136. The rack rail channel 135 may be configured to receive the pair of base rail flanges 129 for a pair of base rails 125. The rack rail channel 135 may be formed as part of the rack rail 130 structure to provide clearance and guidance during insertion and removal operations. The very front end of the rack rail 130 may include a rail bull nose 132 that provides a tapered or rounded leading edge to facilitate smooth insertion of the rack 120 into the base rail 125 system.

Figure 6:
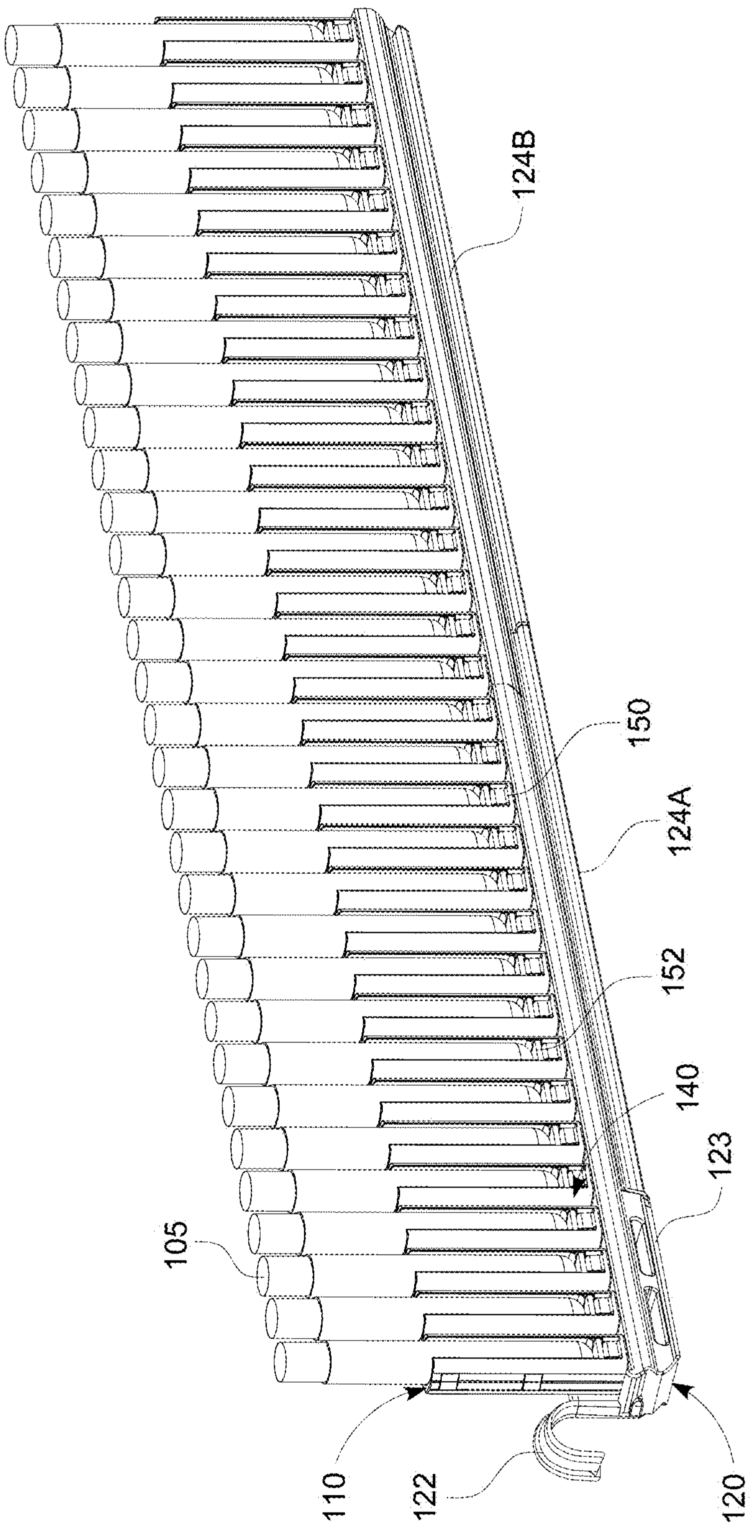
FIG. 6 is a perspective side view of the rack of FIG. 2.

FIG. 6 shows the rack 120 is shown isolated from the base assembly 115. In FIG. 6, the front side of the rack 120 is shown (whereas in FIGS. 2-5, the back side of the rack 120 is shown). In FIG. 6, the retention mechanism for the test tubes 105 is shown according to one example. The articulatable test tube holder assembly 110 includes a plurality of test tube holder modules 140 that carry the test tubes 105. In one aspect, the test tube holder modules 140 may be connected to one another via an articulatable hinge system that is discussed in further detail below. In the retention mechanism shown, a magnet 150 is positioned at the bottom periphery of the test tube holder module 140. Details describing how the test tube holder module 140 is secured to the magnet 150 below it, are described below with respect to FIG. 6B.

Figure 6A:
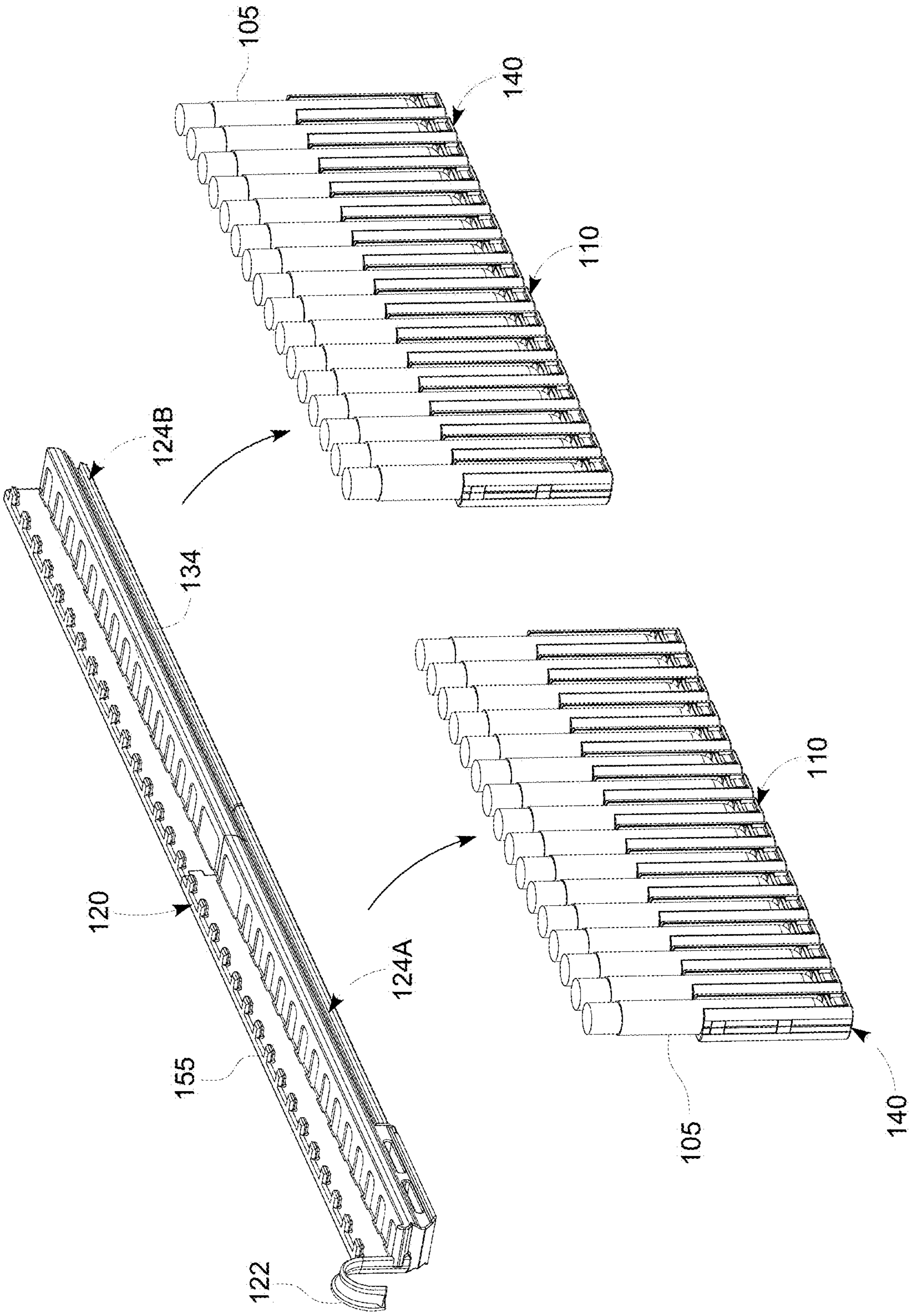
FIG. 6A is a perspective side view of two test tube holder module assemblies exploded from the rack of FIG. 6 according to an aspect.

In FIG. 6A, the rack 120 is shown with two instances of articulatable test tube holder assembly 110 exploded laterally from the rack 120. In addition, details of the rack 120 that provide support to the articulatable test tube holder assembly 110 when carried can be seen. The capacity configuration of the rack system may be designed to accommodate a predetermined number of test tube holder modules 140 that provides optimal balance between processing throughput and system manageability. Each rack 120 may hold thirty two test tube holder modules 140 each. As may be understood, the number of test tube holder modules 140 may be adjusted in some variations of the subject system. The modular construction of the rack 120 allows this capacity to be distributed between the rack front half 124A and the rack back half 124B. Each rack half may an instance of the articulatable test tube holder assembly 110 which hold sixteen test tube holder modules 140 each, creating a balanced distribution that facilitates manufacturing, assembly, and maintenance operations. The sixteen module capacity per rack half provides sufficient processing volume for many laboratory applications while maintaining a manageable size for handling and equipment compatibility. In addition, the capacity may be flexible by allowing the end user to mount only a single articulatable test tube holder assembly 110 when less capacity is needed.

Figure 6B:
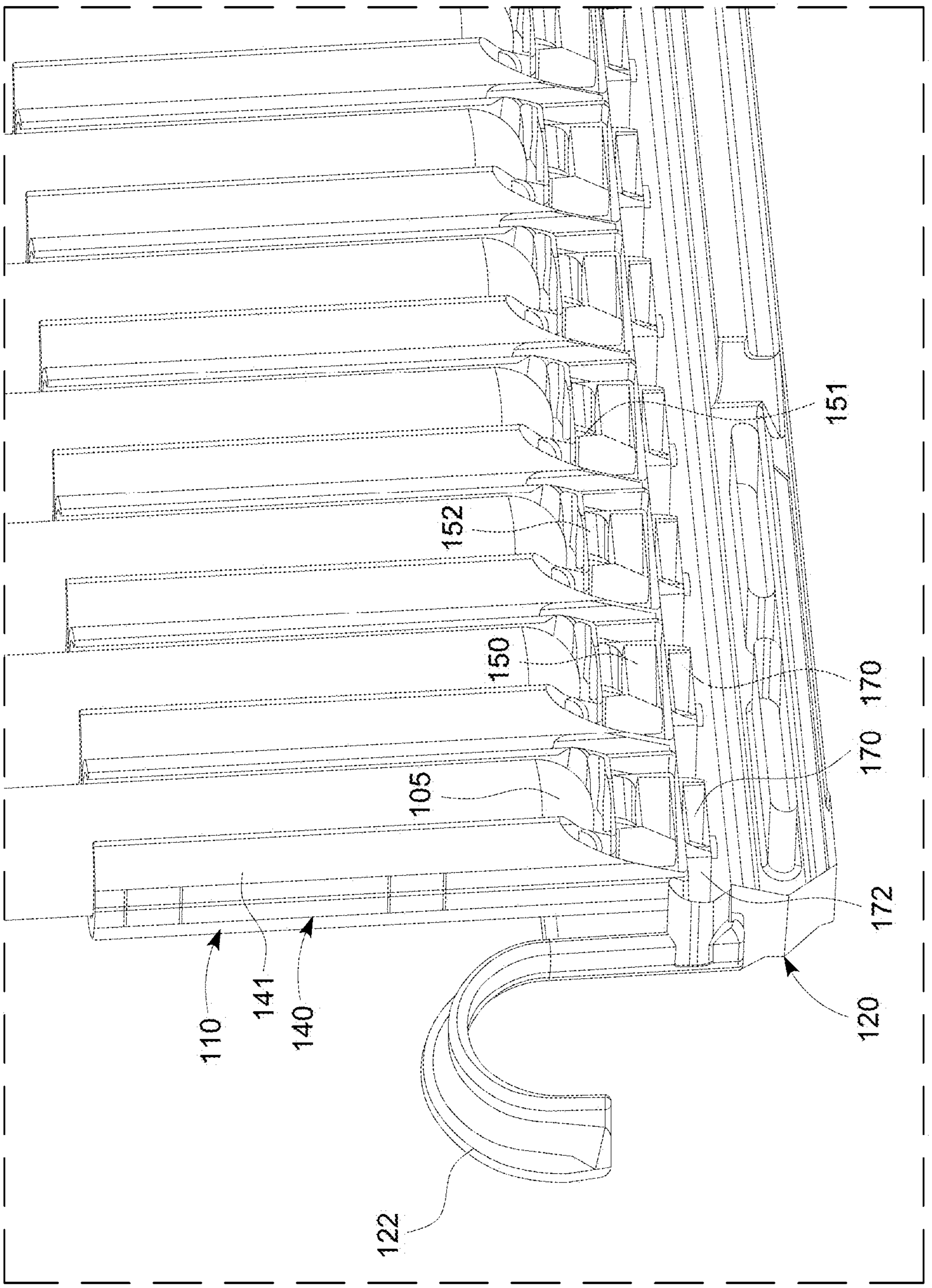
FIG. 6B is an enlarged, perspective, partial cross-sectional view of the end of the rack of FIG. 5, depicting an internal positioning relationship of a magnet to an underlying prong, according to an aspect.

FIG. 6B shows enlarged details of the magnetic relationship of components in the rack 120. The magnet 150 may be held within a seat 151 inside the test tube vial holder module 140. The magnet 150 may be covered by a magnet cap 152 that is placed over the magnet 150, securing the magnet 150 into the seat 151 and preventing the magnet 150 from being inadvertently lifted out from the test tube vial holder module 140. When placed on the rack 120 platform 112, the test tube vial holder assembly 110 and the individual test tube vial holder modules 140 sit on top of the prongs 170 that are inserted into the receptacles 172. See also FIGS. 13-15 which generally show the gratings 165 with metallic prongs 170 that are inserted through prong openings 171 (FIG. 14) on the back side of the rack 120. The prongs 170 provide a metallic element that attracts the magnet 150. The attraction between the magnet 150 and the underlying prong 170 pulls each of the test tube holder modules 140 down towards the platform 112, securing the test tube holder assembly 110 into place on the rack 120.

The articulatable connections between the test tube holder modules 140 allow the sixteen modules 140 to be arranged in various geometric configurations depending on the specific requirements of the laboratory equipment or workflow, with the hinge elements configured to allow each individual test tube holder module 140 to rotate relative to adjacent test tube holder modules 140 for optimal space utilization and operational flexibility.

Centrifuge Features

Referring now to FIGS. 7-12, the liquid handler rack system 100 may be configured for use with different types of centrifuge bucket designs that accommodate various laboratory workflow requirements. The adaptable manipulation of the articulatable test tube holder assembly 110 provides compatibility with multiple liquid handling container geometries. For example, circular and rectangular centrifuge bucket configurations can accommodate the simultaneous receipt of test tubes 105 through the use of specialized guide channel systems that direct the articulatable test tube holder assembly 110 into specific geometric arrangements. These centrifuge bucket configurations take advantage of the articulated nature of the test tube holder modules 140 to maximize the utilization of available space within the centrifuge bucket while maintaining proper test tube orientation and accessibility. As may be further appreciated, the end user benefits from the speed of loading several test tubes 105 by having to only insert a single device (the articulatable test tube holder assembly 110) into the bucket rather than having to perform multiple, individual entries of test tubes 105.

Figure 7:
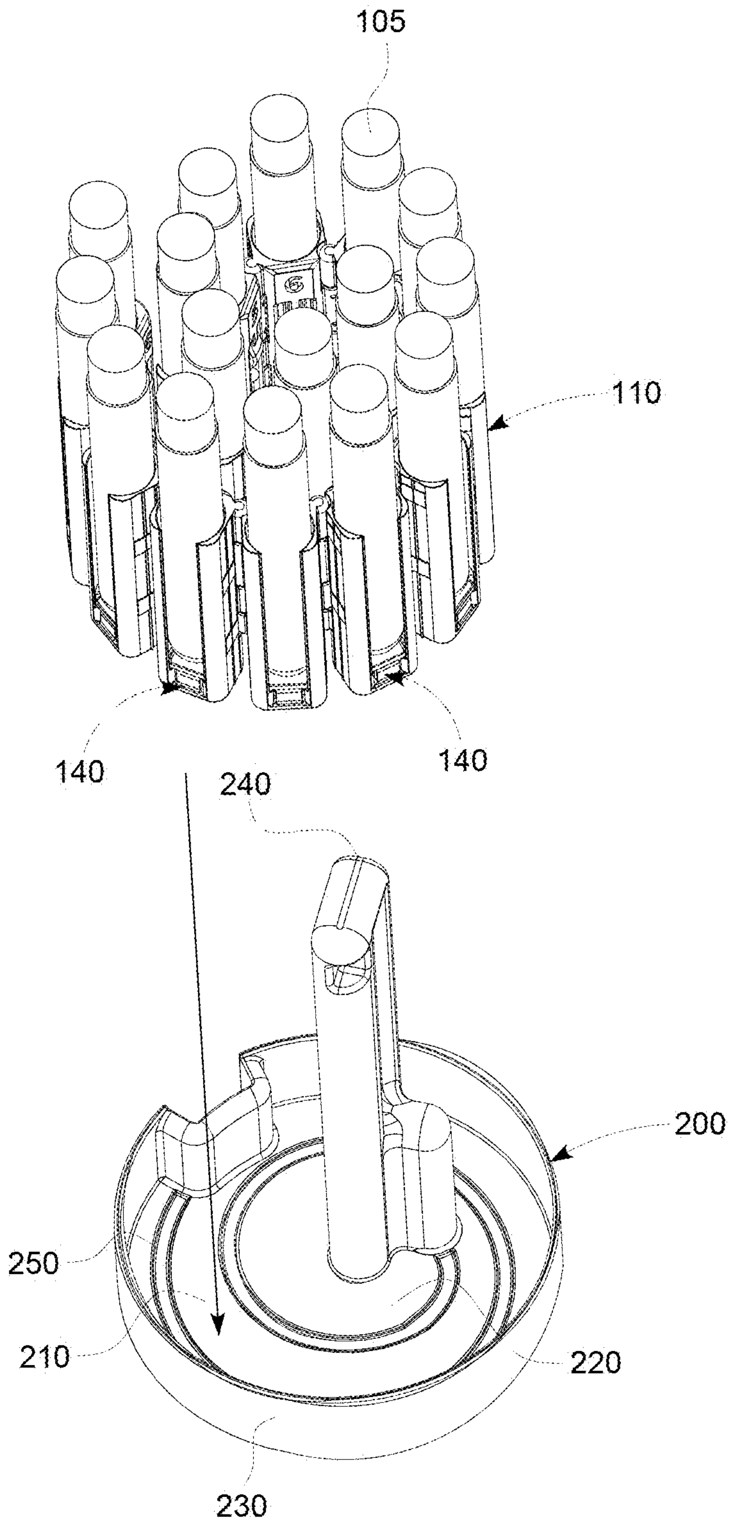
FIG. 7 is a perspective top view of a test tube holder assembly which is configured into a spiral configuration for insertion and holding by a circular centrifuge bucket.
Figure 8:
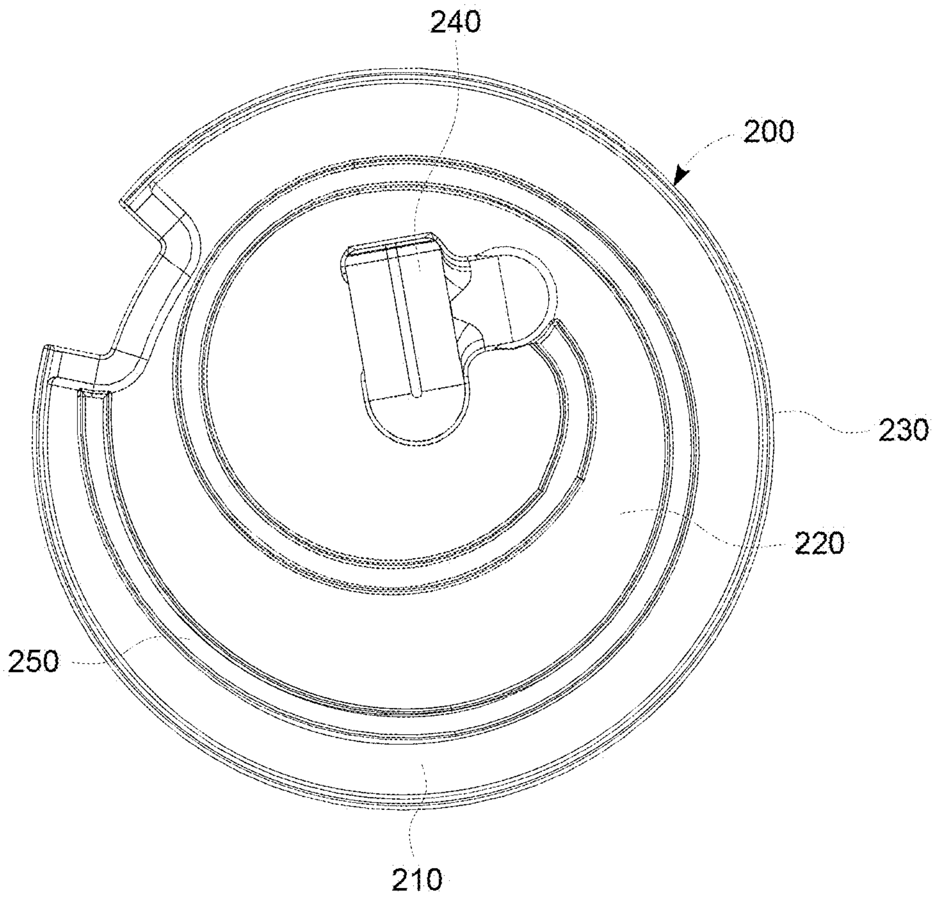
FIG. 8 is a top view of the centrifuge bucket of FIG. 7 without the test tube holder module assembly.
Figure 9:
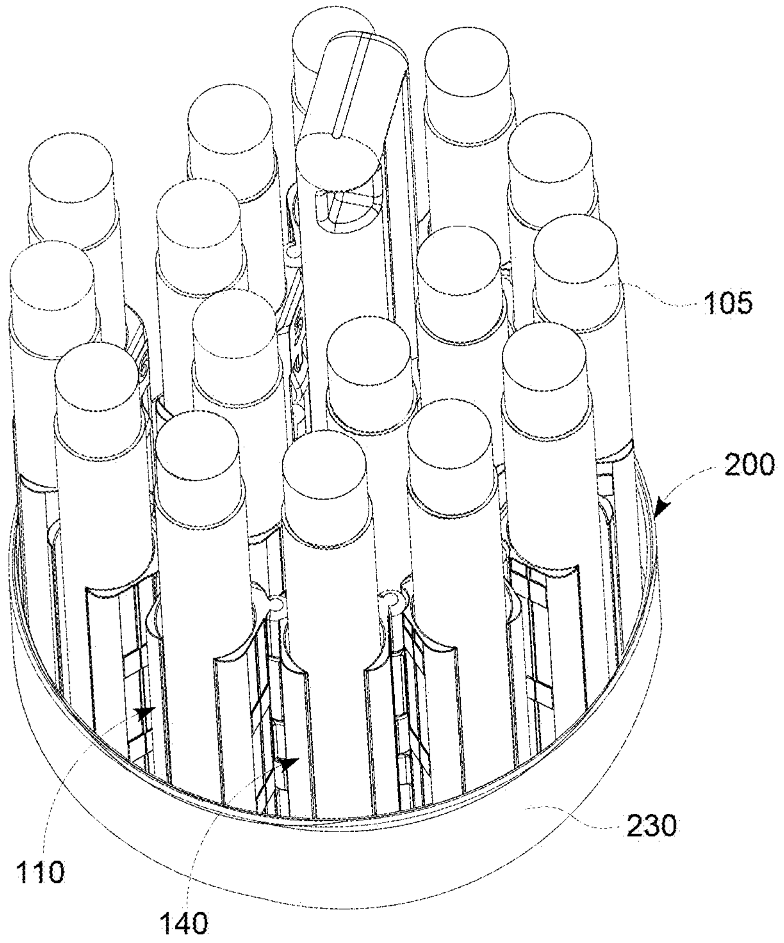
FIG. 9 is a perspective top view of a test tube holder assembly inserted into the circular centrifuge bucket of FIG. 7.

As shown in FIGS. 7-9, in some cases, the articulatable test tube holder assembly 110 may be removed from the rack 120 and mounted into a circular centrifuge bucket 200 that provides a cylindrical containment structure for centrifuge operations. As can be seen in FIGS. 7-8, the circular centrifuge bucket 200 may include a floor 210 that forms the bottom surface of the bucket and a circular side wall 230 that encompasses the floor 210 to create the enclosed bucket volume. The circular side wall 230 may extend upward from the perimeter of the floor 210 to provide containment for the articulatable test tube holder assembly 110 during centrifuge operations. Near the center of the floor 210, a handle 240 may project upward for carrying the circular centrifuge bucket 200 during transport and handling operations. The handle 240 may be positioned to provide balanced lifting characteristics while avoiding interference with the articulatable test tube holder assembly 110 when the assembly 110 is installed within the circular centrifuge bucket 200.

The circular centrifuge bucket 200 incorporates a guide wall 250 that defines a rack guide channel 220 along the floor 210 to direct the positioning of the articulatable test tube holder assembly 110. The guide wall 250 may be formed as a raised structure that extends upward from the floor 210 and follows a predetermined path to create the boundaries of the rack guide channel 220. The rack guide channel 220 may spiral along the floor 210 in a continuous curved path that allows the articulatable test tube holder assembly 110 to be wrapped into a circular formation.

As can be seen in FIG. 9, the spiral configuration of the rack guide channel 220 enables the test tube holder modules 140 to be arranged in a tight spiral pattern that matches the shape of the channel 220 and maximizes the number of test tubes 105 that can be accommodated within the circular centrifuge bucket 200. The guide wall 250 provides lateral support and positioning control for the articulatable test tube holder assembly 110 during insertion and centrifuge operations. The spiral wrapping process may involve the continuous insertion of the articulatable test tube holder assembly 110 into the guidance channel 220 while the previously inserted sections follow the curved path toward the center of the circular arrangement. The articulated joints between test tube holder modules 140 may accommodate the changing radius of curvature as the spiral path progresses from the outer perimeter toward the center of the circular configuration. The guidance channel 220 may provide consistent lateral support to the articulatable test tube holder assembly 110 throughout the spiral path to prevent buckling or misalignment of the articulatable test tube holder assembly 110 during the wrapping process.

Figure 10:
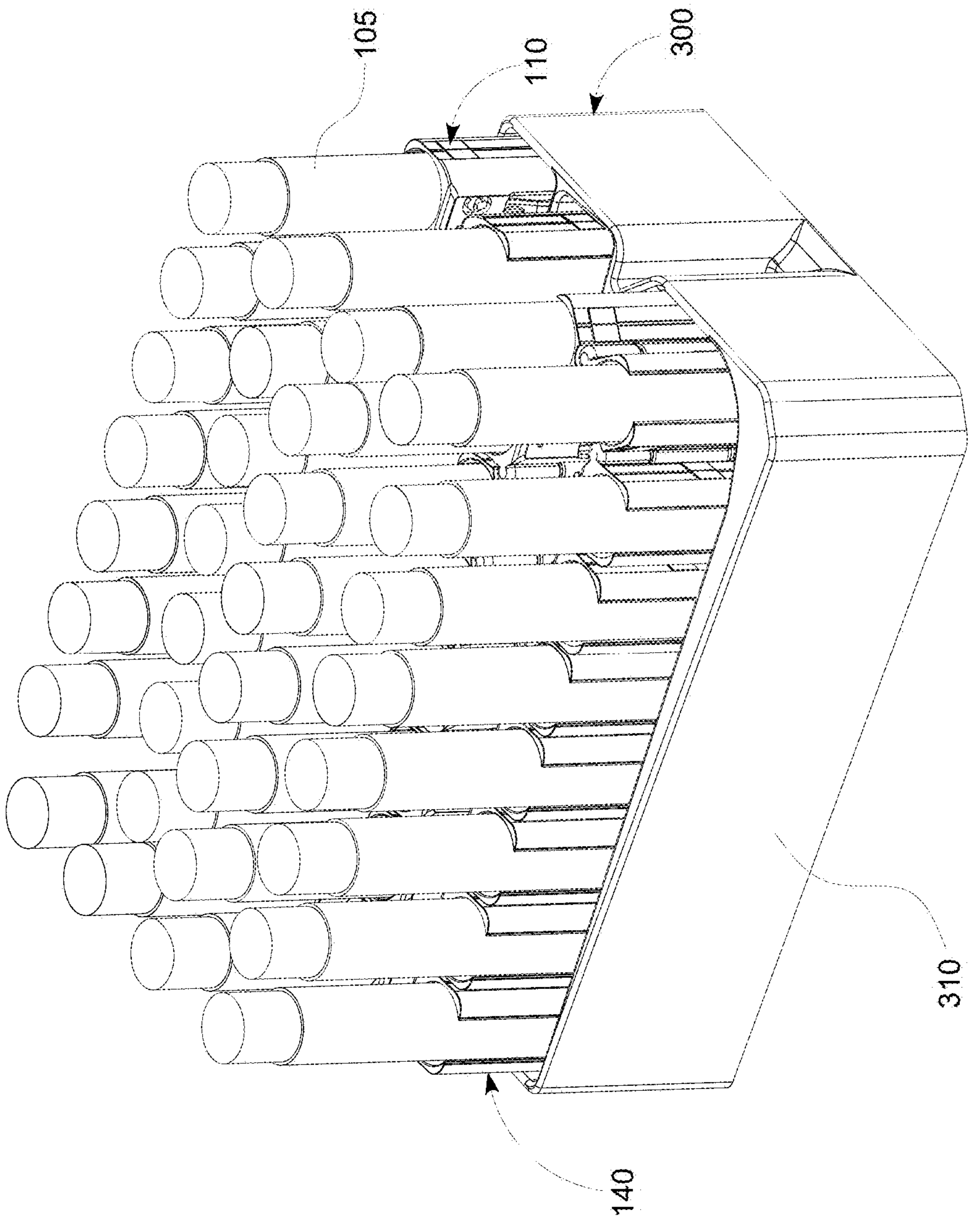
FIG. 10 is a perspective top view of a test tube holder assembly configured into a rectangular configuration to be inserted into a rectangular centrifuge bucket, according to an aspect.
Figure 11:
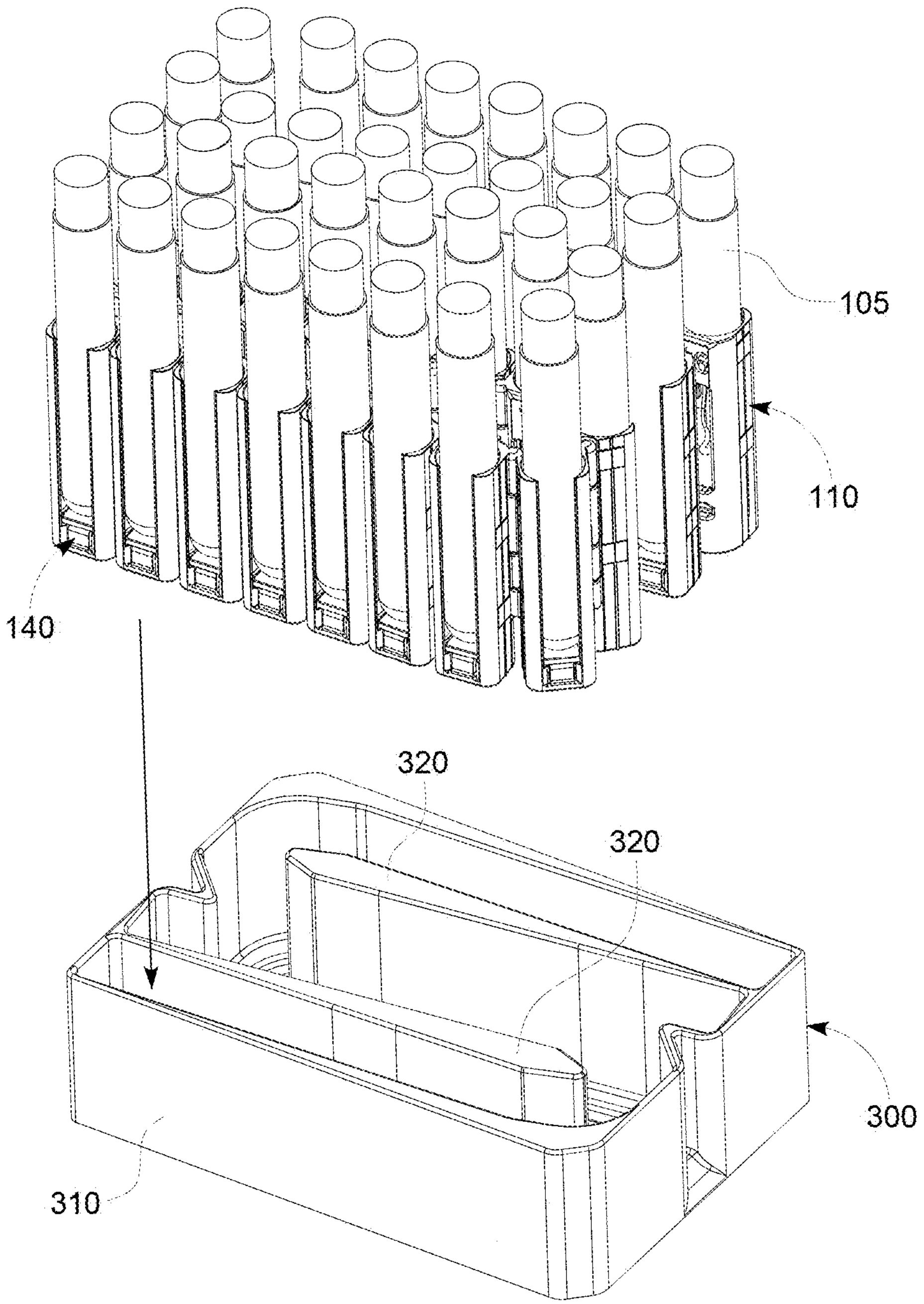
FIG. 11 is a perspective top view of the test tube holder assembly exploded from the rectangular centrifuge bucket of FIG. 10.
Figure 12:
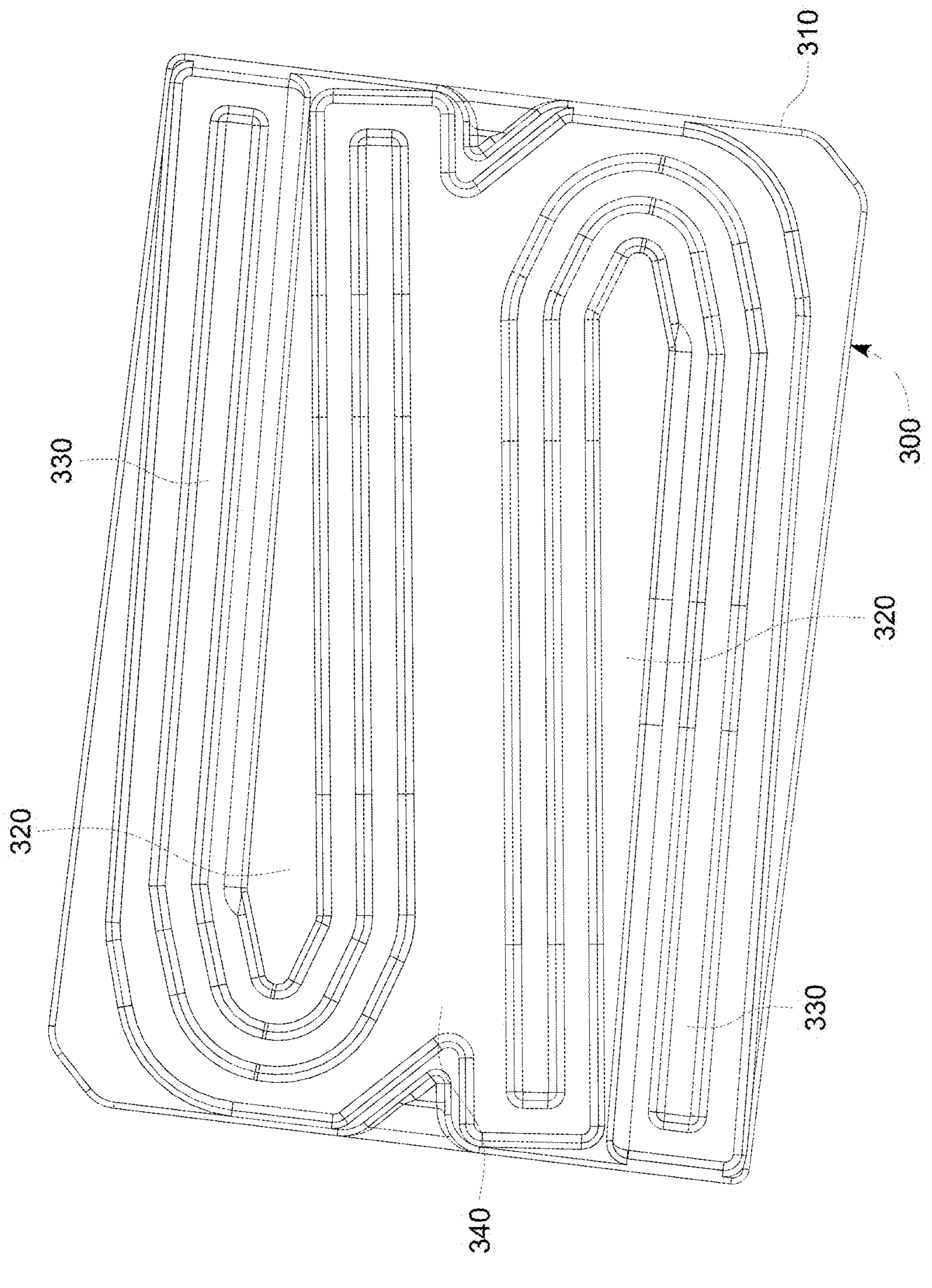
FIG. 12 is a top view of the rectangular centrifuge bucket of FIG. 11 without the test tube holder module assembly.

The rectangular centrifuge bucket, sometimes referred to as a standard SDS-16 or 96-well plate format, 300 of FIGS. 10-12 provides an alternative configuration that accommodates the articulatable test tube holder assembly 110 in a different geometric arrangement suitable for rectangular centrifuge equipment designs. As shown in FIG. 10, the articulation provided by the articulatable test tube holder assembly 110 allows for the test tube module holders 140 to be situated in rows within the bucket 300 without having to disassemble any individual test tube holder modules 140 from their connection to adjacent test tube holder modules 140.

FIGS. 11 and 12 show the internal details of the bucket 300 that cooperate with the articulatable test tube holder assembly 110 to accommodate simultaneous insertion of the plurality of test tube holder modules 140. The rectangular centrifuge bucket 300 may include a floor 340 that forms the bottom surface of the bucket and rectangular side walls that extend upward from the perimeter of the floor 340. The rectangular configuration provides a different internal volume geometry compared to the circular centrifuge bucket 200 and requires a corresponding adjustment in the arrangement of the articulatable test tube holder assembly 110 to achieve optimal space utilization and operational performance.

The rectangular centrifuge bucket 300 incorporates a pair of guide baffles 320 that are positioned to define a rack guide channel 330 with a switchback-shaped configuration. The guide baffles 320 may be formed as raised structures that extend upward from the floor 340 and are spaced apart to create the boundaries of the rack guide channel 330. The switchback-shaped rack guide channel 330 may be configured as a serpentine path that includes multiple directional changes and parallel segments that allow the articulatable test tube holder assembly 110 to be arranged in a compact folded pattern. The switchback path configuration enables the test tube holder modules 140 to wrap in a switchback fashion, while staying connected, that efficiently utilizes the rectangular internal volume of the rectangular centrifuge bucket 300. The guide baffles 320 provide structural support and directional guidance for the articulatable test tube holder assembly 110 as the assembly 110 follows the switchback path defined by the rack guide channel 330. The process of inserting the articulatable test tube holder assembly 110 into the bucket 300 using a switchback configuration may be initiated when the articulatable test tube holder assembly 110 encounters the guide baffles 320 that define the serpentine path within the rectangular centrifuge bucket 300. The guide baffles 320 may provide directional control that causes the articulatable test tube holder assembly 110 to follow a back-and-forth pattern with parallel segments connected by curved transition zones (as can be seen in FIG. 12). The articulatable connections between test tube holder modules 140 allow the assembly to navigate the directional changes required for the switchback pattern while maintaining proper component alignment and spacing relationships.

As may be appreciated, the operational characteristics of the articulatable test tube holder assembly 110 depend on the coordinated interaction between multiple subsystems (such as the hinge elements of the articulatable test tube holder assembly 110 interacting with the guide wall 250 of bucket 200 or with the baffles 320 and guide channel 330 of bucket 300) that work together to enable flexible configuration capabilities. The articulatable test tube holder assembly 110 may transition between different geometric arrangements through the controlled articulation of interconnected components (as will be discussed below with respect to FIGS. 20 and 21A) that respond to the external guidance systems and spatial constraints of the above-identified features of buckets 200 and 300. The articulated connections between individual components allow the system to adapt its overall shape while maintaining secure retention of laboratory test tubes and preserving proper spacing relationships between adjacent components. The transformation process may involve the sequential rotation of multiple articulated joints that collectively produce the desired overall system configuration.

The articulated connections between test tube holder modules 140 allow each individual module 140 to rotate relative to its adjacent modules 140 in response to external guidance forces or spatial constraints. The cumulative effect of multiple small rotational adjustments across the articulatable test tube holder assembly 110 enables the test tube holder modules 140 to conform to complex curved paths while maintaining proper component spacing and test tube retention characteristics. The articulated joints between test tube holder modules 140 may provide sufficient rotational freedom to accommodate tight radius curves while incorporating mechanical limits that prevent over-rotation or component damage during configuration changes.

Rack Modularity and Connections

Referring now to FIGS. 13-19, details of the rack 120 are shown. The liquid handler rack system 100 incorporates a modular rack design that facilitates assembly, maintenance, and customization for different laboratory applications. Each rack 120 may be constructed from two primary sections that can be joined together to form a complete rack assembly.

Figure 13:
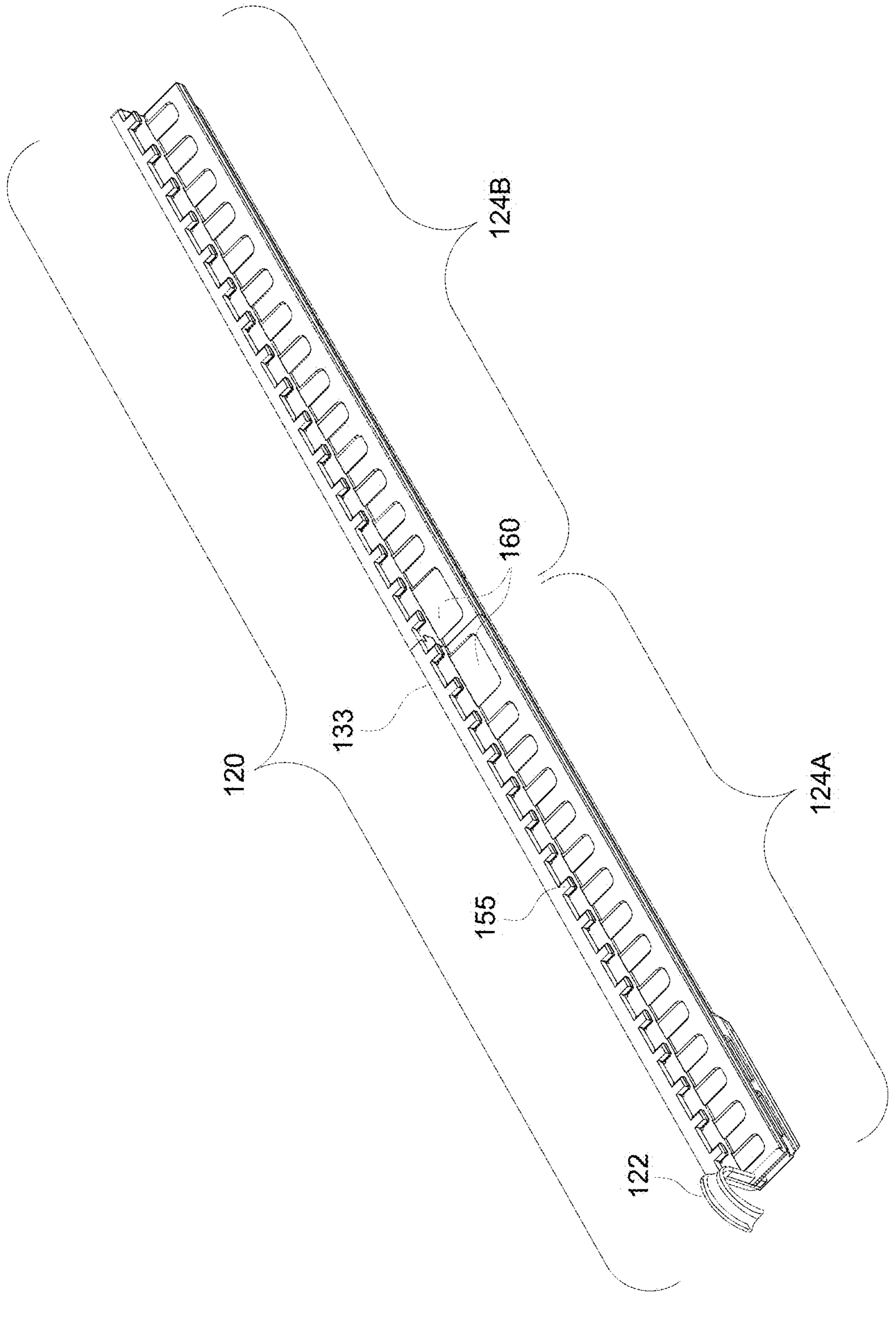
FIG. 13 is a perspective top view of a rack of the system of FIG. 1, according to an aspect.
Figure 14:
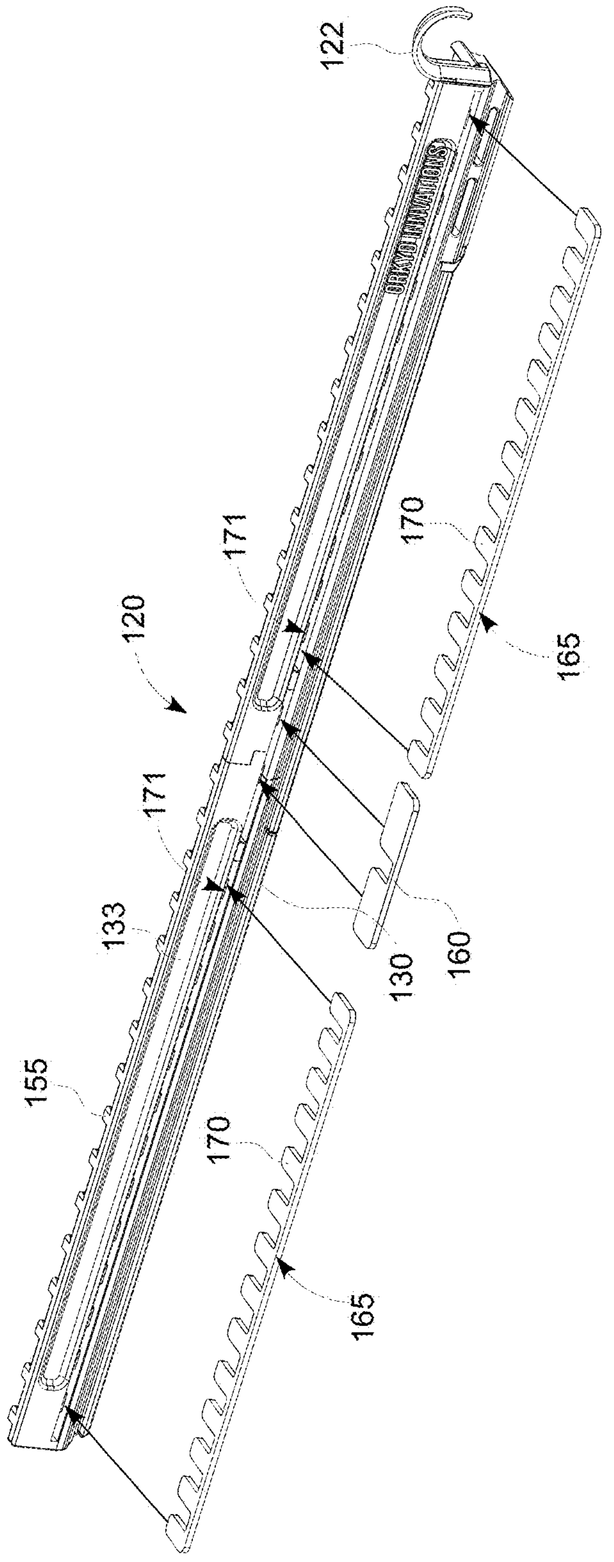
FIG. 14 is an exploded, perspective left side view of the rack of FIG. 13.
Figure 15:
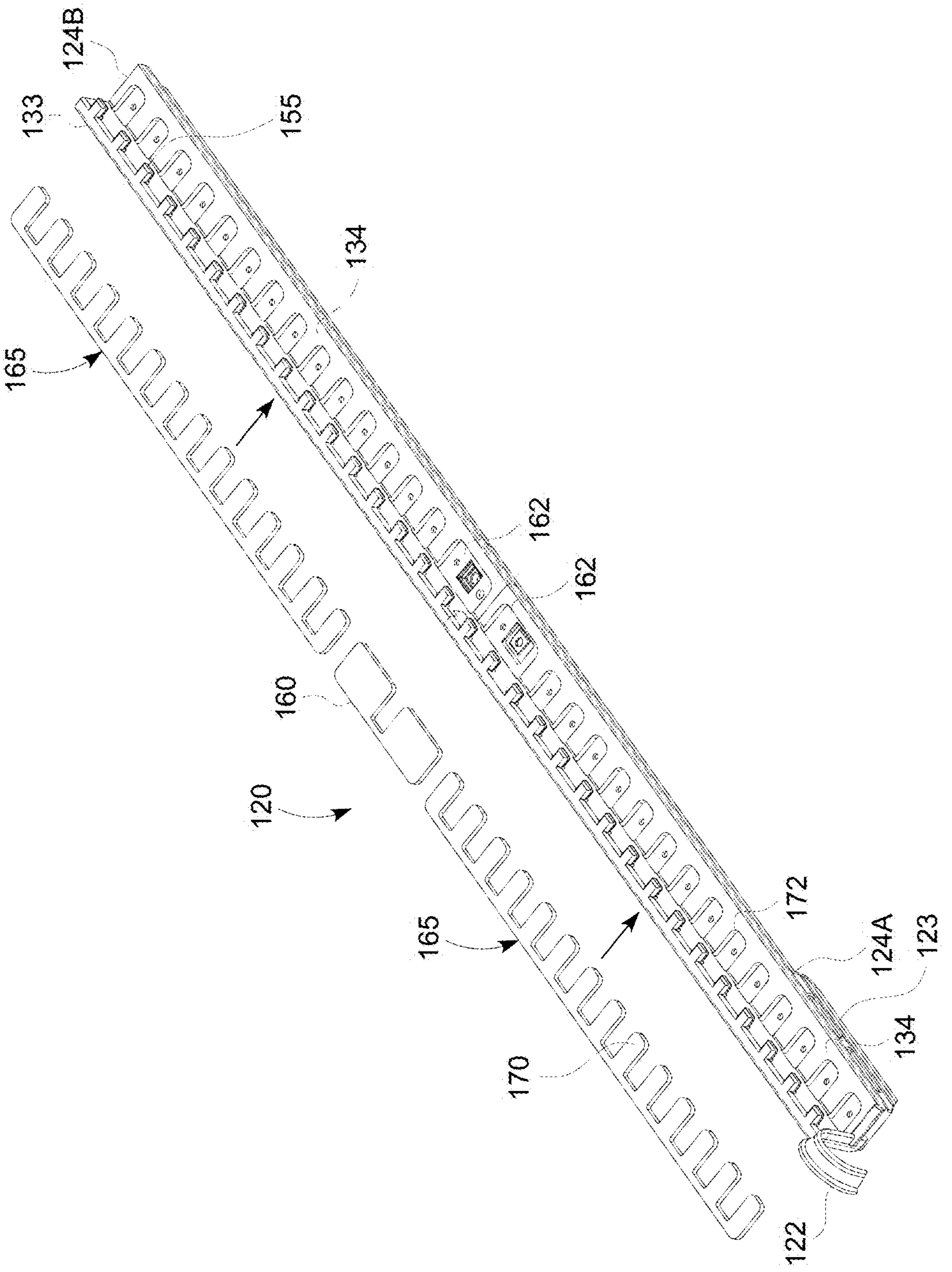
FIG. 15 is an exploded, perspective, top, right side view of the rack of FIG. 13.
Figure 16:
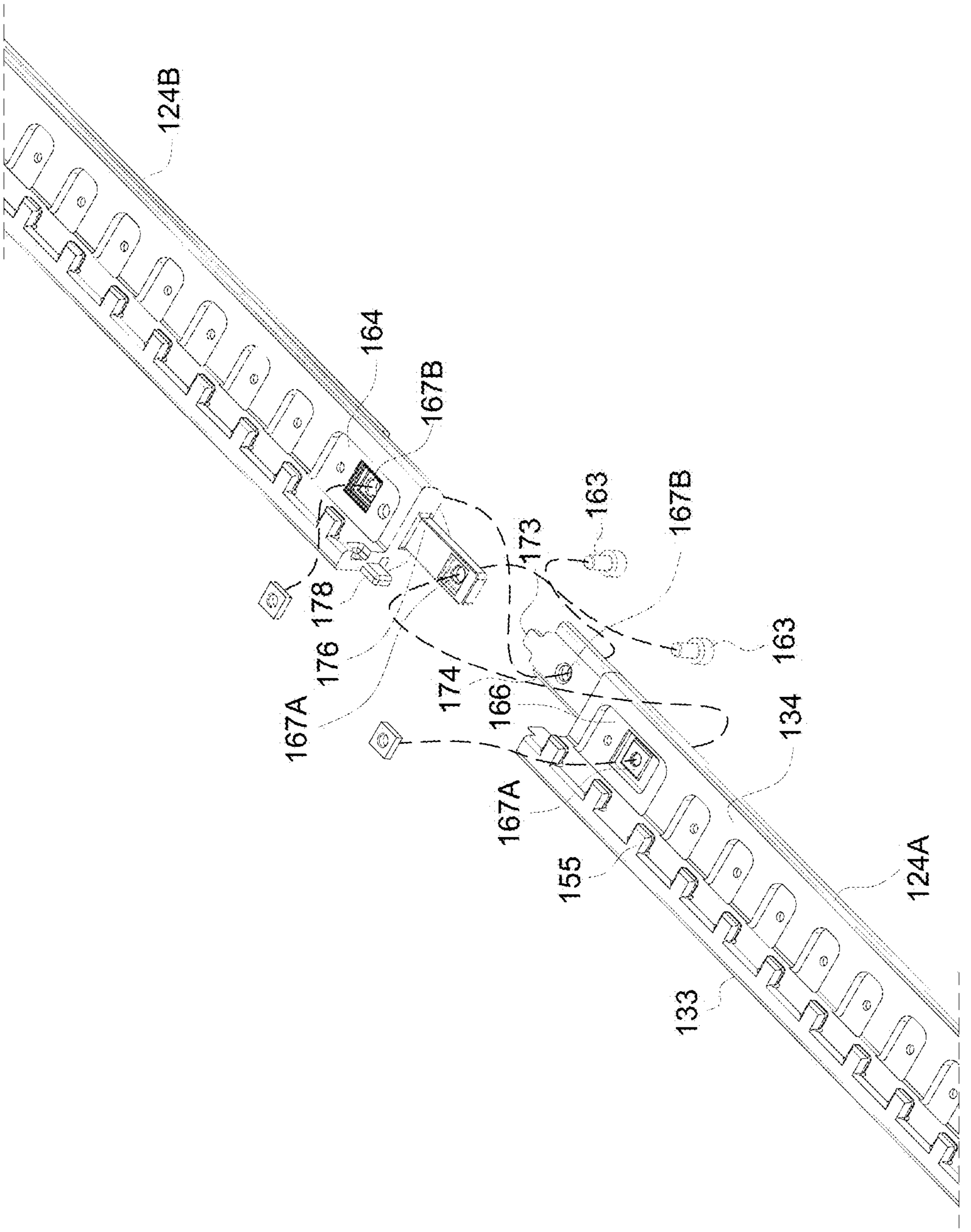
FIG. 16 is an enlarged perspective top, broken view of two halves of the rack of FIG. 15, and respective elements exploded from each other.
Figure 17:
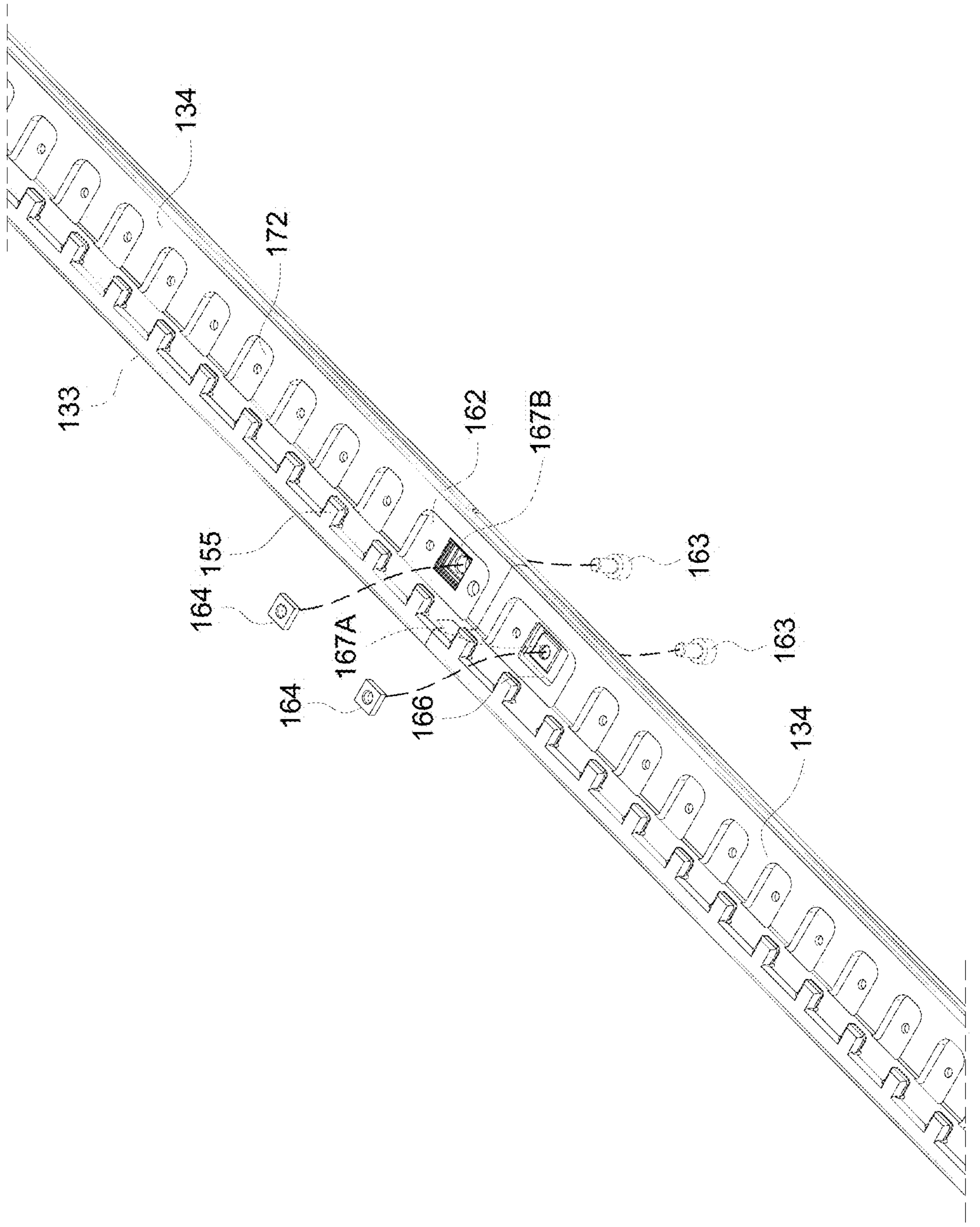
FIG. 17 is an enlarged perspective top, view of two halves of the rack of FIG. 16, connected back together with fastener elements exploded from the two halves.
Figure 18:
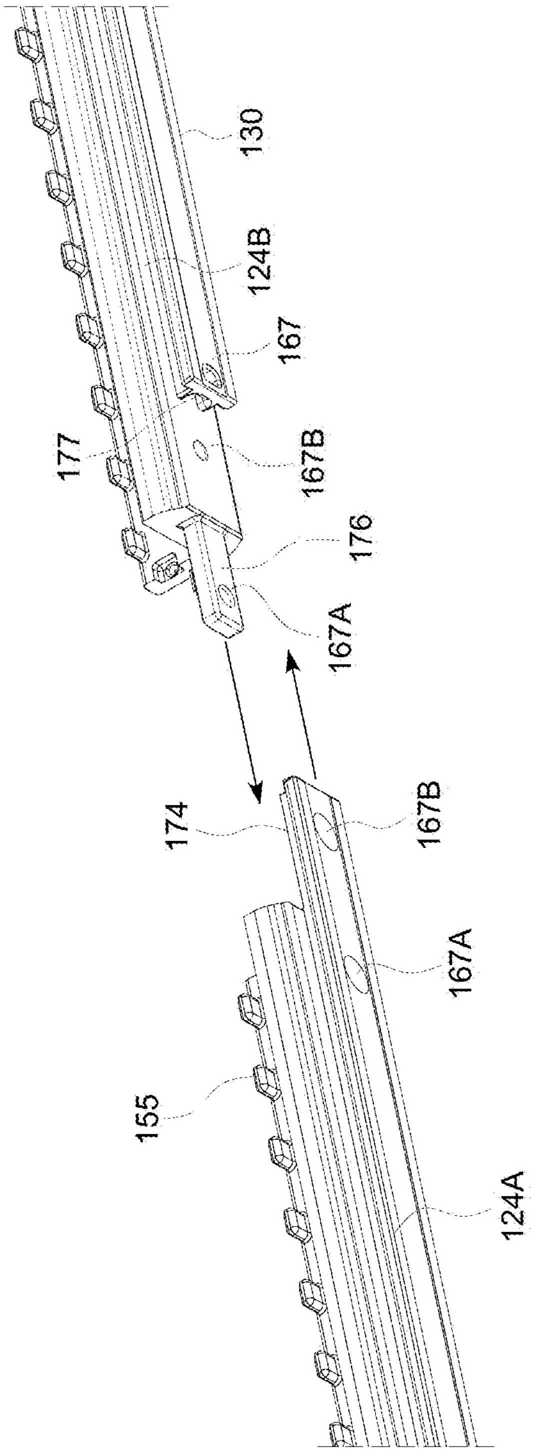
FIG. 18 is an enlarged perspective bottom, view of the two halves of the rack of FIG. 16.

As shown in FIGS. 13-15, the rack front half 124A and rack back half 124B may be manufactured as separate components and subsequently coupled together via a coupler 160 during assembly. This two-piece construction approach allows for efficient manufacturing processes and enables replacement of individual sections when maintenance or repair operations are required. The rack assembly incorporates a grating 165 system that provides structural support and positioning features for the articulatable test tube holder assembly 110. The grating 165 may include a plurality of prongs 170 that project outward therefrom in the same direction as the teeth 155 of the retaining wall 133. The platform 134 of the rack 120 may include a plurality of prong receptacles 172 that are positioned and sized to receive the individual prongs 170 when the grating 165 is installed into the platform 134. This prong and receptacle system creates a mechanical interlock that maintains the position of the grating 165 relative to the platform 134 while allowing for controlled insertion and removal operations. The alignment of the prongs 170 with the teeth 155 direction ensures that the grating 165 integrates properly with the overall rack geometry and does not interfere with the positioning or operation of the articulatable test tube holder assembly 110. The projecting elements of coupler 160, grating 165, and prongs 170 may be made of steel and may be utilized as an interface for the magnets 150 of FIG. 21A in the test tube holders modules 140.

Figure 19:
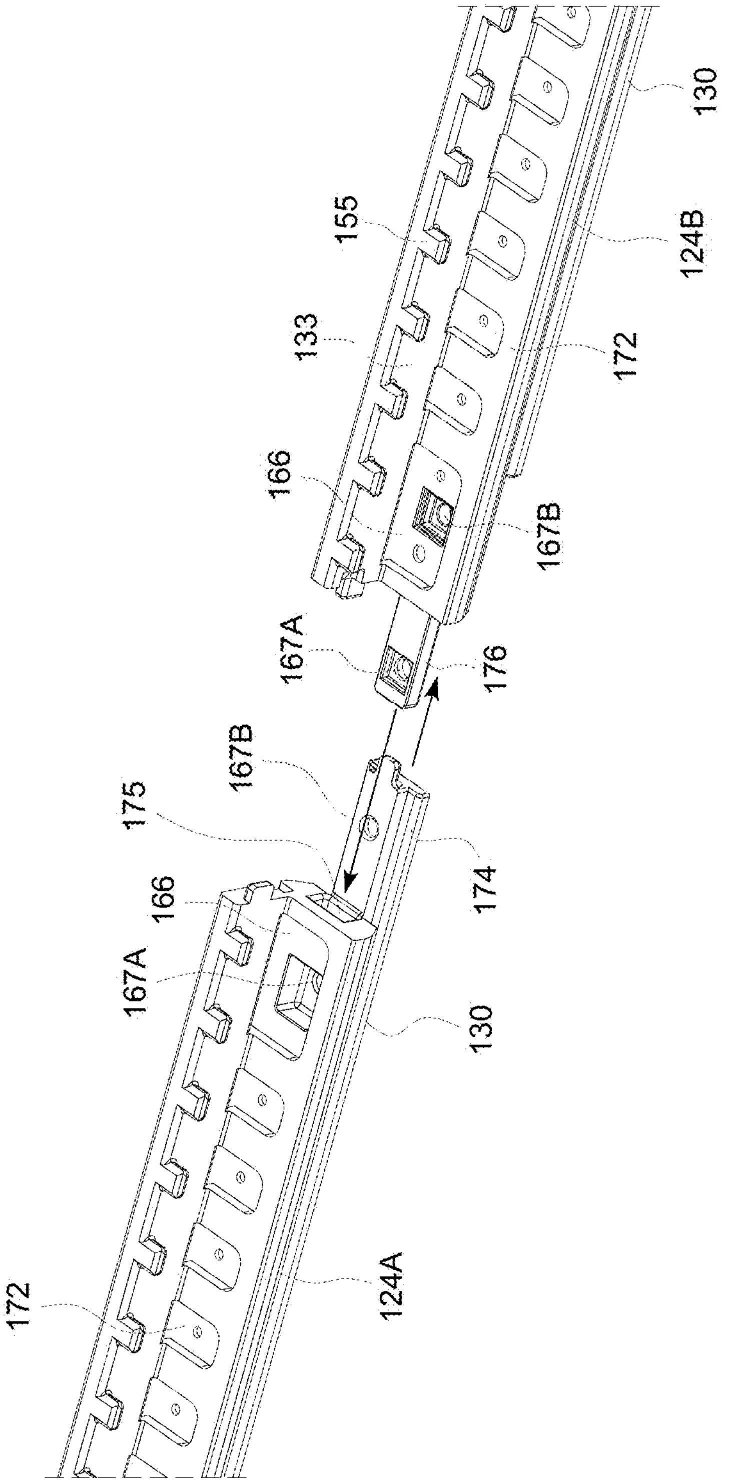
FIG. 19 is a broken, top perspective view of the two halves of the rack of FIG. 18.

Referring to FIGS. 14-15 and 19, the prong receptacle system integrated into both the rack front half 124A and rack back half 124B provides precise positioning and secure retention for the grating prongs 170 during assembly and operation. The platform 134 of each rack section may include multiple prong receptacles 172 that are positioned and sized to receive individual prongs 170 when the grating 165 is installed onto the platform 134. The prong receptacles 172 may be formed as integral features of the platform 134 structure during the manufacturing process, ensuring precise dimensional control and consistent positioning across multiple rack assemblies. Each prong receptacle 172 may be designed with internal geometry that provides a secure fit with the corresponding prong 170 while allowing for controlled insertion and removal operations when maintenance or reconfiguration is required. The completed grating installation creates a mechanical interlock that maintains the position of the grating 165 relative to the rack platform 134 while providing structural support for the articulatable test tube holder assembly 110 components that may be mounted on or connected to the grating 165. The metal prongs 170 may be further secured into their respective grating position within the receptacles 172 with a medical device adhesive.

As shown in FIGS. 16-19, the structural connection between the rack front half 124A and rack back half 124B incorporates multiple complementary mechanisms to ensure secure assembly and proper alignment. The rack front half 124A may include a lower tongue 174 with a tab 173 that projects longitudinally therefrom in the direction of the rack back half 124B. The rack back half 124B may include an upper tongue 176 and a tab 178 that projects longitudinally in the direction of the rack front half 124A. The section of the rack rail 130 on the rack back half 124B may include a slot 177 positioned to receive the lower tongue 174 during assembly operations. When the lower tongue 174 is slid into the slot 177, the upper tongue 176 slides into a slot 175 housed within the rack front half 124A past the lower tongue 174, creating an interlocking connection between the two rack sections.

The mechanical fastening system for the rack assembly utilizes a series of through holes and fasteners to create a secure and permanent connection between the rack sections. The rack 120 may include a plurality of through holes 167 that are strategically positioned to align when the rack front half 124A and rack back half 124B are properly positioned together. The through holes 167A may be designated for holes that are meant to be lined up with each other in one set of alignment positions, while the through holes 167B may be designated for another set of holes that are meant to be aligned with each other in different positions. When the tongue and slot connections are properly engaged, the through holes 167A are all lined up together and the through holes 167B are lined up together, allowing fasteners such as bolts 163 and square nuts 164 to be coupled together to secure the elements of the rack front half 124A to the rack back half 124B. This fastening approach distributes mechanical loads across multiple connection points and provides resistance to separation forces that may be encountered during operation.

The construction of the rack 120 incorporates a two-piece design that facilitates manufacturing efficiency and enables modular assembly operations in laboratory environments. The rack front half 124A and rack back half 124B may be manufactured as separate components using injection molding or other suitable manufacturing processes that allow for precise dimensional control and consistent part quality. The two-piece construction approach provides several operational advantages, including the ability to replace individual sections when wear or damage occurs, simplified inventory management for replacement parts, and enhanced flexibility in configuring racks with different length specifications or specialized features.

The interlocking mechanisms between the rack front half 124A and rack back half 124B incorporate multiple complementary connection systems that work together to create a secure and properly aligned assembly. As can be seen primarily in FIGS. 16, 18, and 19, the primary structural connection may utilize a tongue and slot system where the rack front half includes a lower tongue with a tab that projects longitudinally toward the rack back half. The rack back half 124B may include an upper tongue 176 and a tab 178 that projects longitudinally in the direction of the rack front half 124A. The section of the rack rail 130 on the rack back half may include a slot 177 positioned to receive the lower tongue 174 during assembly operations. When the lower tongue 174 is inserted into the slot 177, the upper tongue 176 slides into a corresponding slot 175 housed within the rack front half 124A, creating an interlocking connection that prevents separation of the two rack sections under normal operating loads.

The mechanical fastening system for the rack assembly provides permanent connection capabilities through the use of strategically positioned through holes and corresponding fasteners. The rack may include multiple sets of through holes that are precisely positioned to align when the rack front half 124A and rack back half 124B are properly positioned together. One set of through holes 167A may be designated for alignment in specific positions, while another set of through holes 167B may be positioned for alignment in different locations to distribute mechanical loads across the joint interface. When the tongue and slot connections are properly engaged, the through hole sets align to allow fasteners such as bolts and square nuts to be inserted and tightened to secure the rack front half 124A to the rack back half 124B. The fastening system may utilize multiple connection points to provide resistance to separation forces, torsional loads, and other mechanical stresses that may be encountered during laboratory operations.

Articulatable Test Tube Holder Assembly

Figure 20:
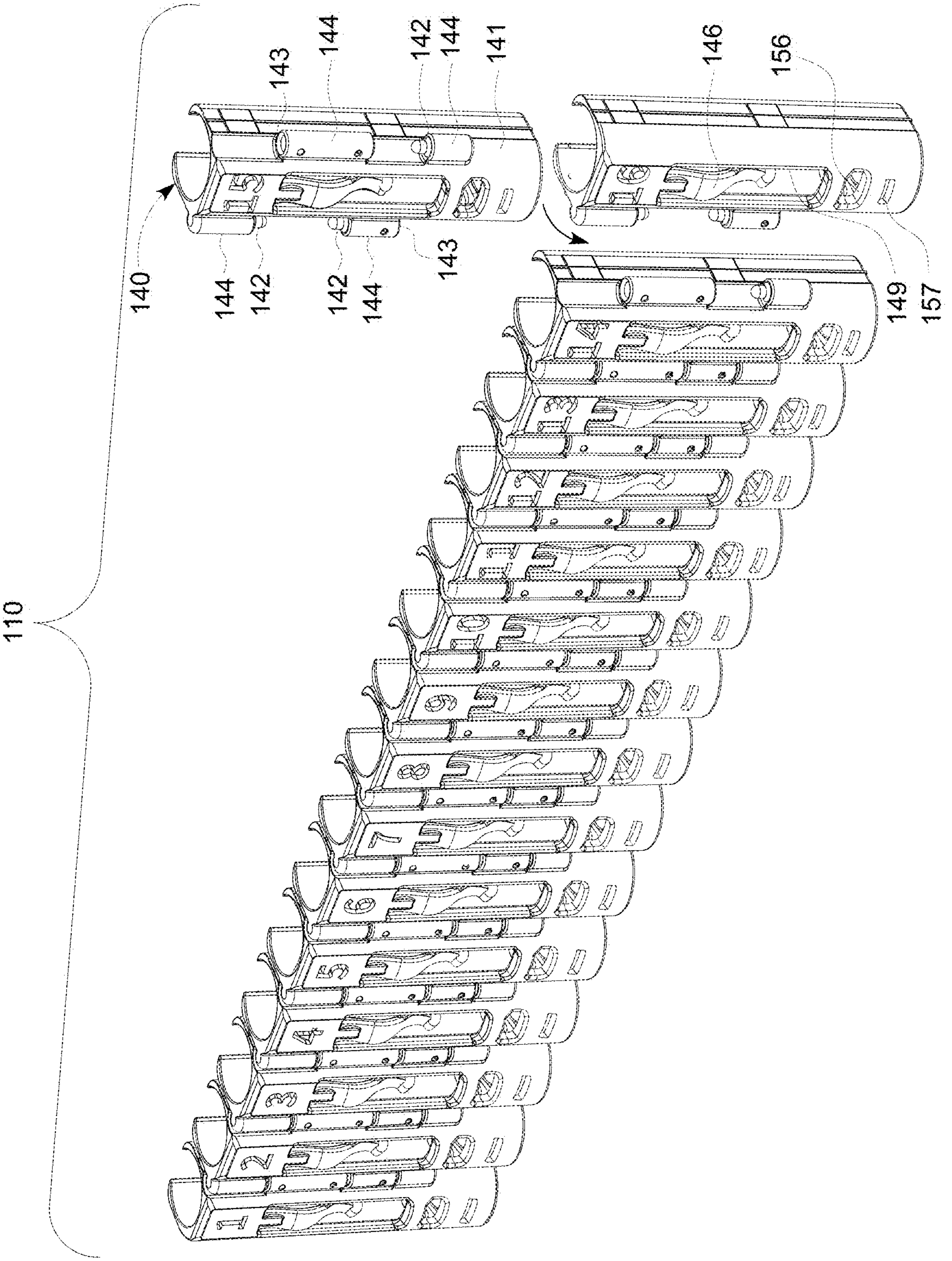
FIG. 20 is an enlarged, perspective, top, left side view of a test tube holder module assembly of the system of FIG. 1, with a single test tube holder module exploded from the assembly, according to an aspect.
Figure 21:
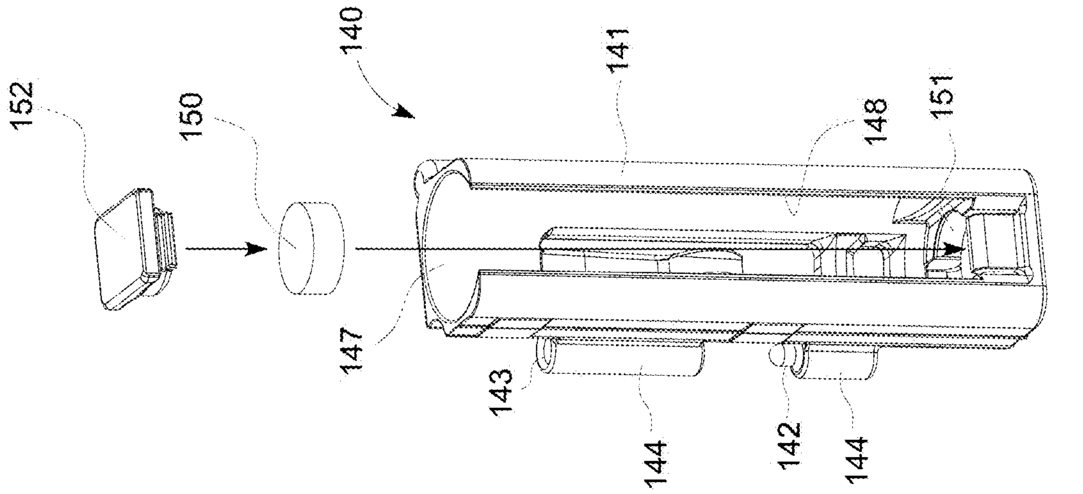
FIG. 21 is an exploded perspective rear view of a test tube holder module of the assembly from FIG. 20.
Figure 22:
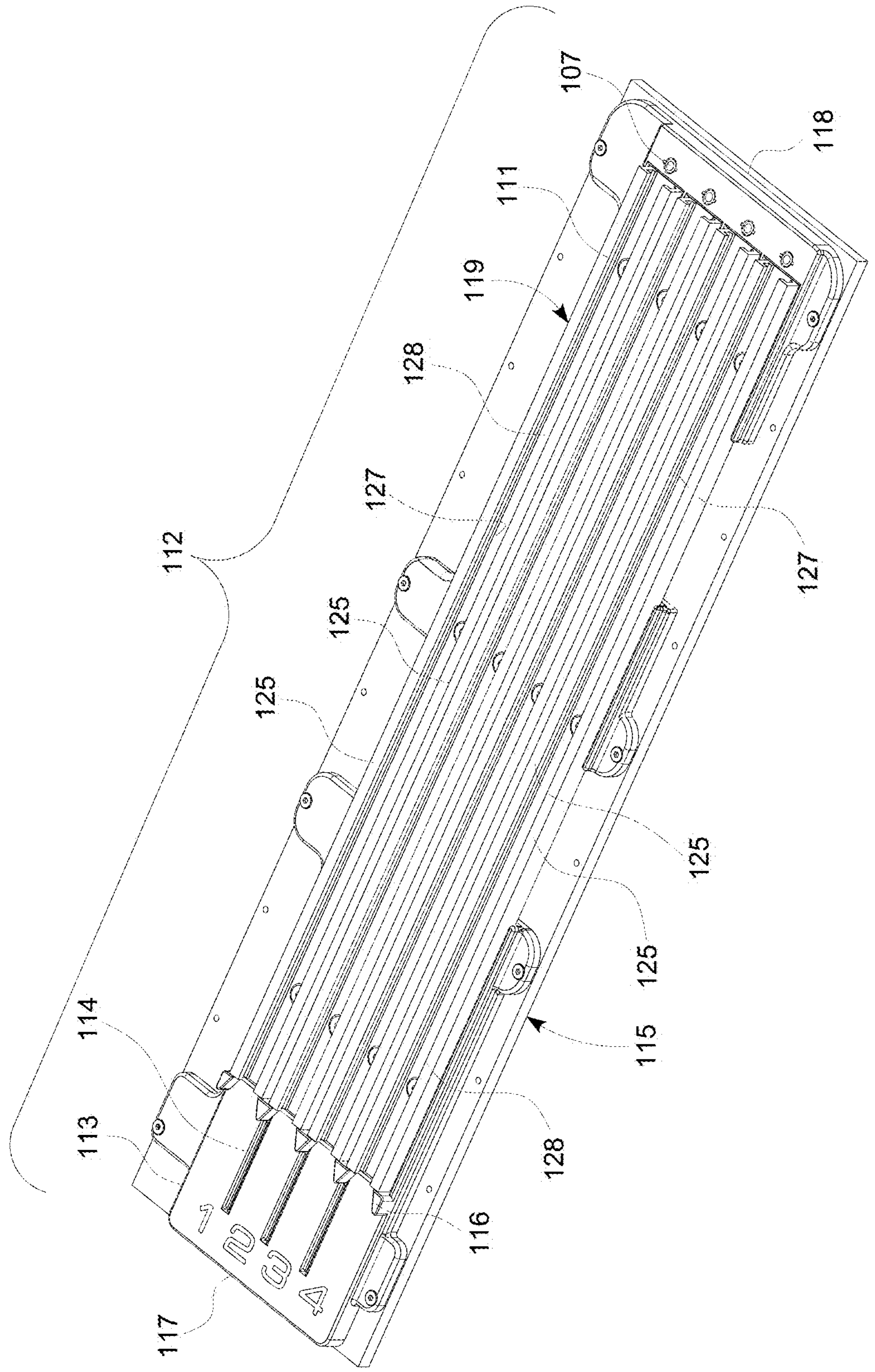
FIG. 22 is a perspective top view of a base assembly of the system of FIG. 1, according to an aspect.
Figure 23:
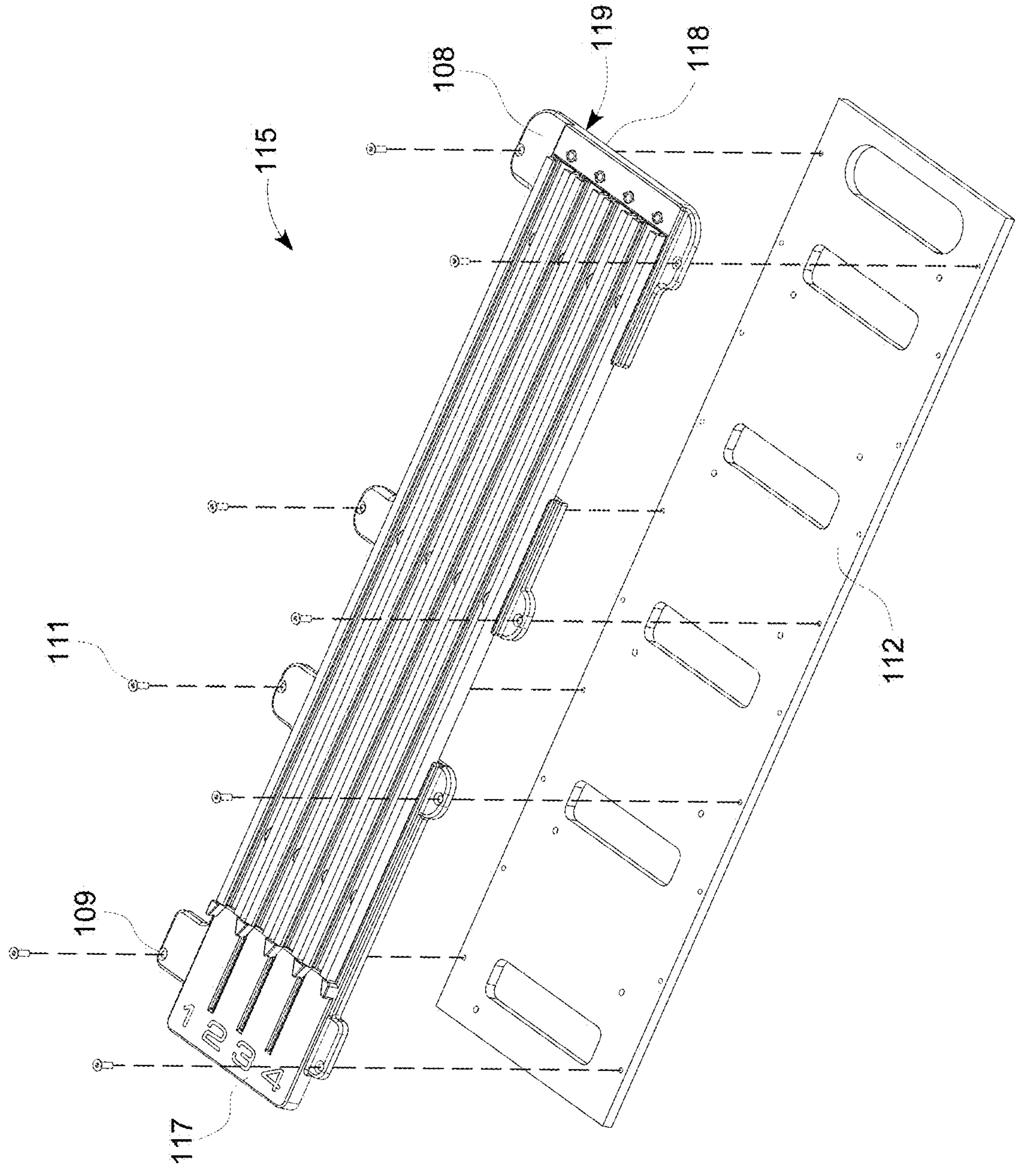
FIG. 23 is an exploded view of the base assembly of FIG. 22.
Figure 24:
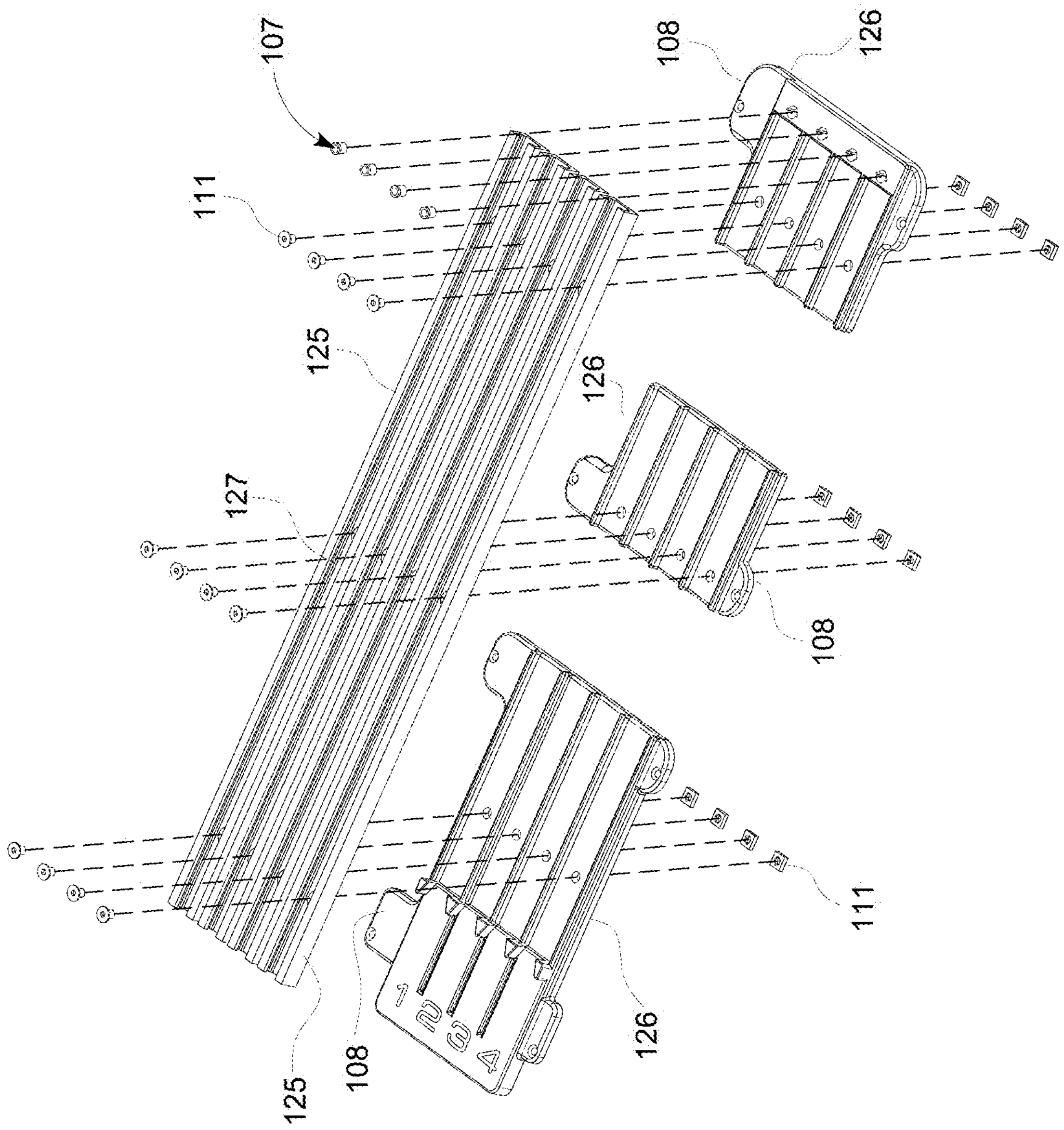
FIG. 24 is an exploded view of a rail assembly from the base assembly of FIG. 23.
Figure 25:
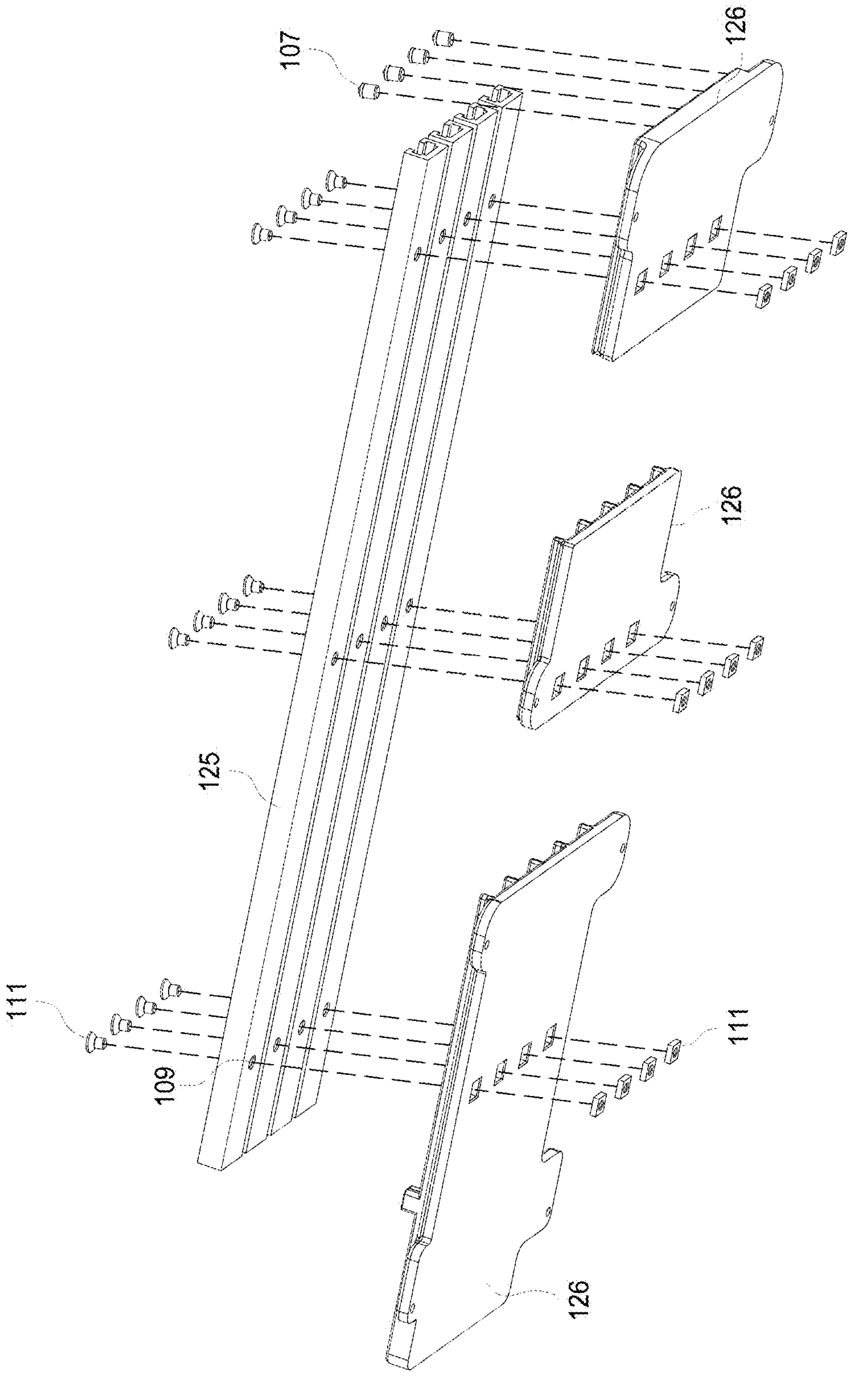
FIG. 25 is a bottom perspective view of the rail assembly of FIG. 24.
Figure 26:
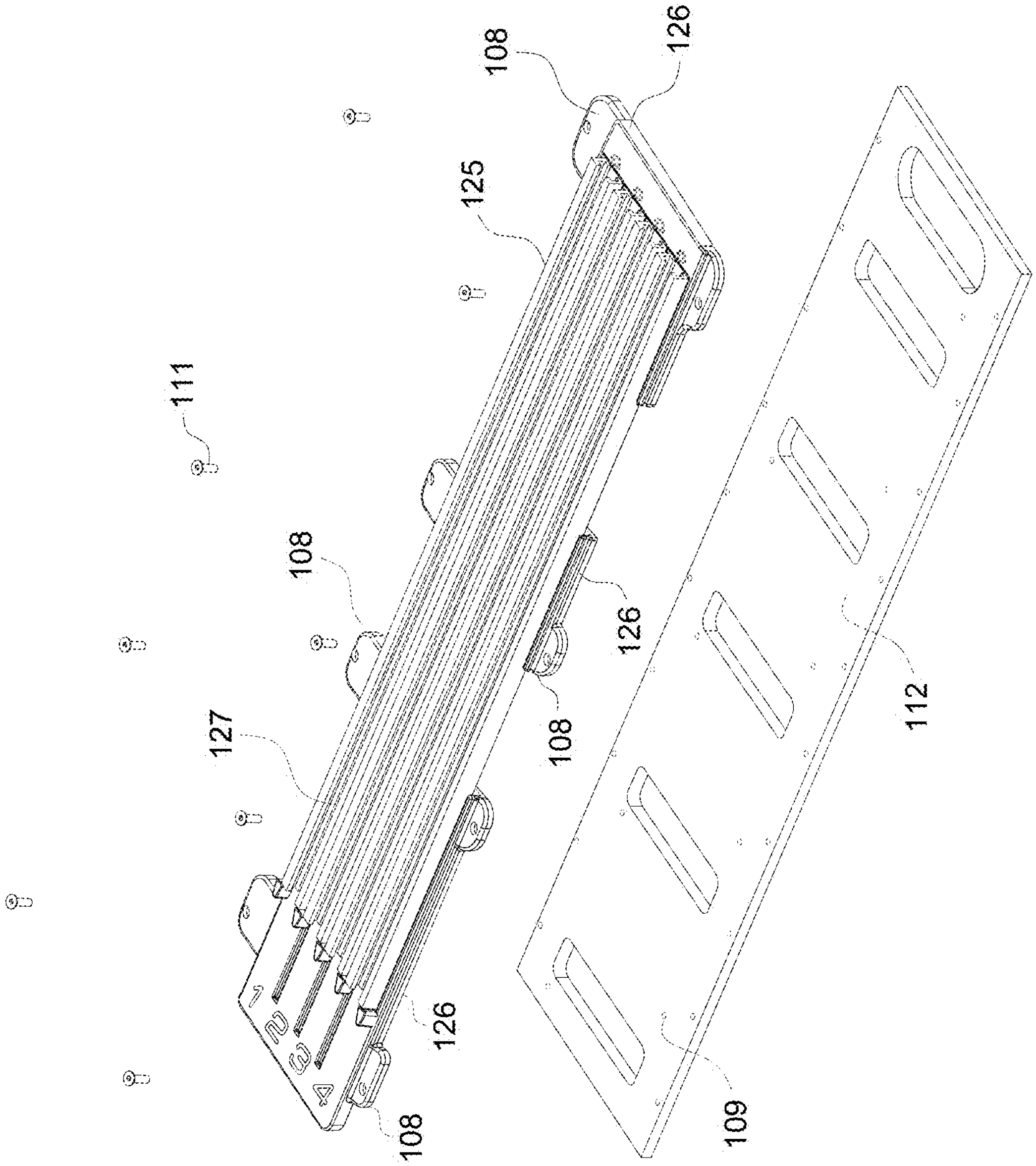
FIG. 26 is an enlarged broken view of the base assembly of FIG. 24.
Figure 27:
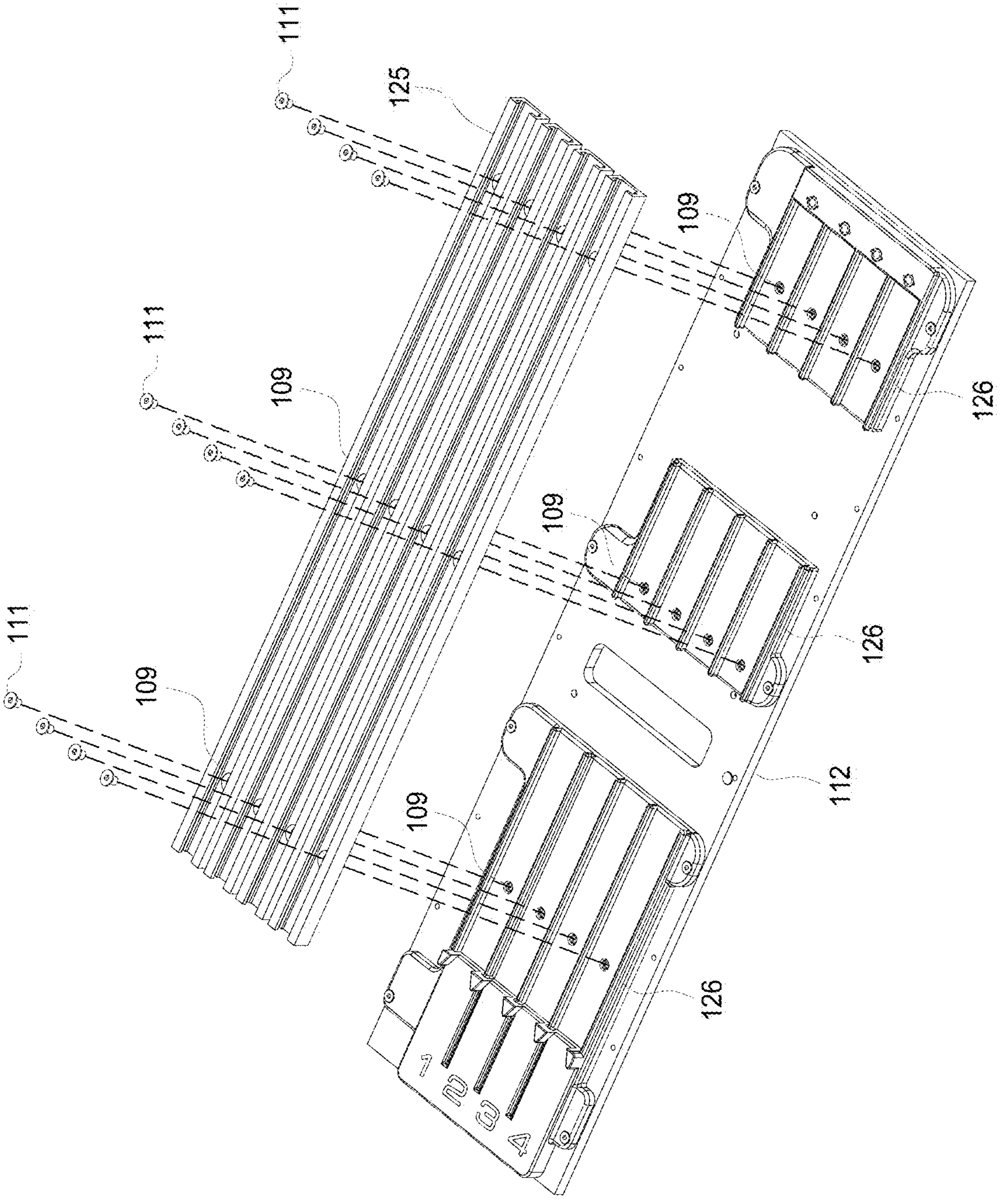
FIG. 27 is a top perspective view of a set of rails and set of fasteners exploded from the base assembly of FIG. 22.
Figure 28:
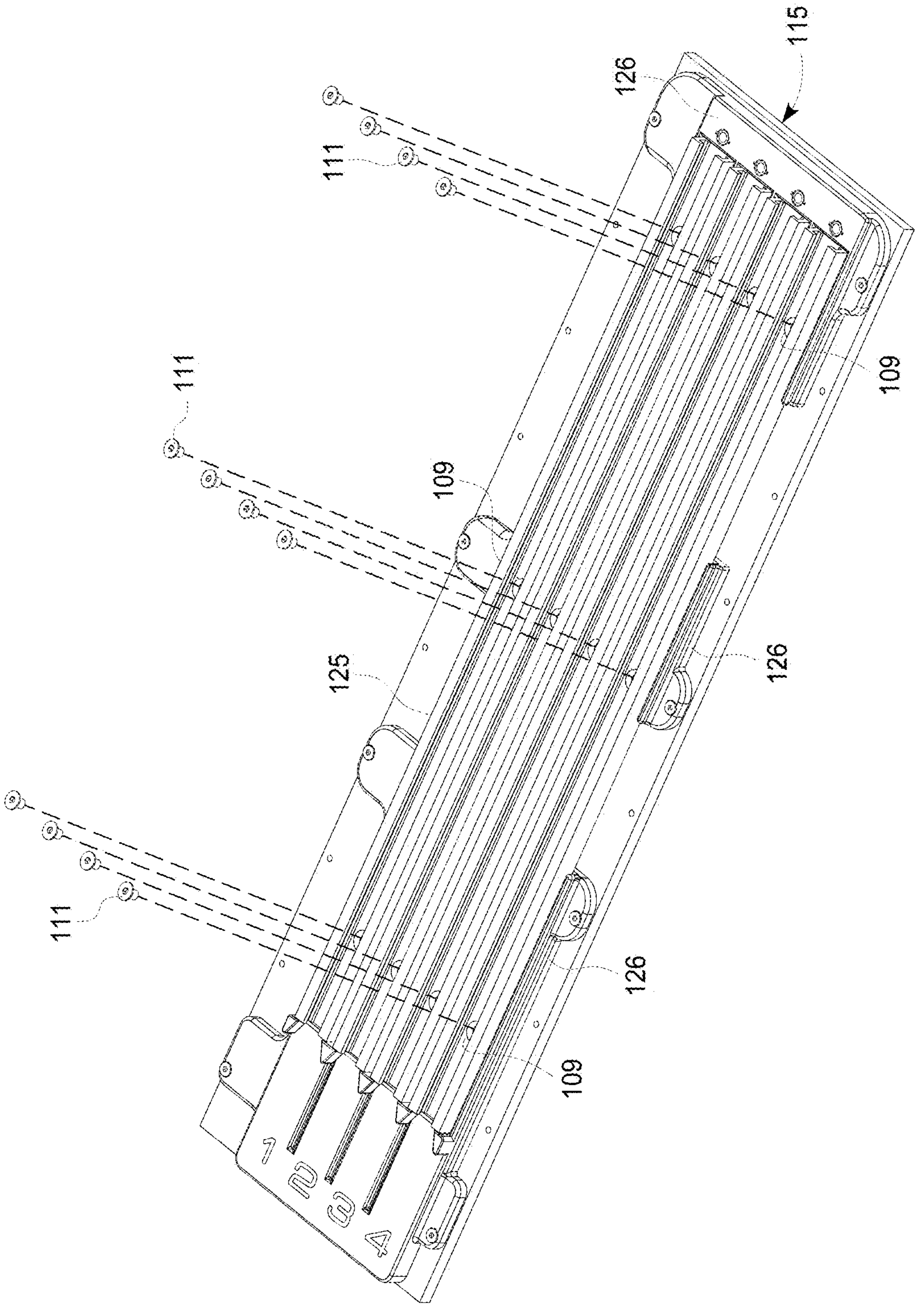
FIG. 28 is a top perspective view of the base assembly of FIG. 22 with fasteners exploded therefrom.

FIGS. 20 and 21A show details of the elements in the articulatable test tube holder assembly 110. The articulatable test tube holder assembly 110 incorporates individual test tube holder modules 140 that provide secure containment and positioning for laboratory test tubes 105 while enabling flexible arrangement configurations through articulated connections. Each test tube holder module 140 may be constructed with a casing 141 that defines an internal compartment 147 for receiving and retaining a test tube 105 during laboratory operations. The casing 141 may be designed with asymmetric front and back configurations that facilitate both secure test tube retention and convenient test tube insertion and removal operations. The modular design of the test tube holder modules 140 allows for standardized manufacturing processes while providing the flexibility to accommodate different test tube sizes and laboratory workflow requirements.

The casing 141 of each test tube holder module 140 may incorporate a primarily closed front side that provides structural integrity and protection for the contained test tube 105. The front side of the casing 141 may include a window 149 that provides visual access to the interior of the compartment 147 and allows for monitoring of the test tube 105 contents or visual access to any test tube labels and barcodes during laboratory operations. The window 149 may be sized and positioned to provide adequate visibility while maintaining the structural strength of the casing 141. The front side of the casing 141 may include a slot 156 for receipt of teeth 155 when the grating 165 is mated with the articulatable test tube holder assembly 110. (See FIG. 4 and FIG. 20). In contrast to the closed front side design, the casing 141 may have an open backside that facilitates test tube insertion and removal operations. The opening on the backside may be defined by a pair of clamp edges 148 that create a controlled access pathway into the compartment 147 while providing retention forces to maintain the test tube 105 in position during operation.

The test tube retention system of each test tube holder module 140 may incorporate multiple complementary mechanisms that work together to provide secure test tube positioning under various operational conditions. A leaf spring 146 may project into the window 149 and may be positioned to contact and retain a test tube 105 within the casing 141. The leaf spring 146 may be configured to apply a controlled retention force against the test tube 105 that maintains the test tube 105 position while allowing for insertion and removal operations when appropriate forces are applied. The leaf spring 146 may be manufactured from materials that provide consistent spring characteristics over repeated use cycles and may be designed to accommodate variations in test tube diameter or surface characteristics. The positioning of the leaf spring 146 within the window 149 allows for visual confirmation of proper test tube seating while providing mechanical retention functionality.

As shown in FIG. 21A, a magnetic retention system is incorporated into each test tube holder module 140 (At the bottom of the compartment 147, a magnet 150 may be inserted into a magnet seat 151 that provides precise positioning and secure retention of the magnet 150 within the casing 141. The magnet seat 151 may be formed as an integral part of the casing 141 structure and may be sized and shaped to accommodate the specific dimensions and geometry of the magnet 150. The magnet 150 may be retained within the magnet seat 151 by a magnet cap 152 that prevents displacement of the magnet 150 during operation while providing a stable platform surface for test tube support. The magnet cap 152 may include a square platform top that provides a flat, stable surface upon which a test tube 105 may rest, ensuring consistent test tube positioning and orientation within the compartment 147. Each magnet 150 is positioned to assist in mounting the plurality of casings 141 to the rack holder platform 134 surface through attraction to the metallic projection elements of coupler 160 and grating 165 that are aligned with the flanged ends of metallic prongs 170 in receptacles 172. The casings 141 may be further secured by the raised rectangular projections of holder teeth 155 on the rear supporting rack retaining wall 133.

The articulated connection system between individual test tube holder modules 140 enables the assembly 110 to conform to various geometric configurations while maintaining secure connections between adjacent modules. In some aspects, the hinge elements may rotate from 0 degrees to 100 degrees providing a large range of flexibility in the rack configuration. A hinge system may utilize male and female boss fittings positioned on knuckles 144 that are strategically located at different levels on the left and right sides of each casing 141 to create interlocking connections with adjacent test tube holder modules 140. On the left side of each casing 141 (relative to the front side which has the window 149), there may be a pair of knuckles 144 positioned at different vertical levels. The top knuckle 144 may have a male boss fitting 142 projecting downward, while the bottom knuckle 144 may be spaced from the top knuckle 144 and may have a male boss fitting 142 projecting upward toward the top knuckle 144. The bottom knuckle 144 on the left side may also include a female boss fitting 143 facing downward to receive corresponding male boss fittings from adjacent modules.

The right side of each casing 141 may incorporate a complementary knuckle arrangement that enables proper interlocking with the left side knuckles 144 of adjacent test tube holder modules 140. The right side may include a knuckle 144 positioned at a level between the top knuckle 144 and the bottom knuckle 144 of the left side of the casing 141. The right side may also include a bottom knuckle 144 that may be positioned below the level of the bottom knuckle 144 of the left side of the casing 141. The middle knuckle 144 on the right side may have a female boss fitting 143 on both its top end and its bottom end, allowing the middle knuckle 144 to receive male boss fittings from adjacent modules at multiple connection points. The bottom knuckle 144 on the right side may have a male boss fitting 142 projecting upward therefrom to engage with corresponding female boss fittings on adjacent modules.

The plurality of casings 141 which make up the test tube assembly 110 may be 3D printed through selective laser sintering (SLS) assembled in sets of 16, with the magnet cap 152 assembled on after insertion of magnet 150. By way of example and not limitation, the male boss fittings 142 and the female boss fittings 143 may be sized and positioned so that the flex of the material allows male boss fittings 142 to snap into place in the female boss fittings 143. Moreover, the plurality of casings 141 may be fabricated using 3D printing technology with the male boss fittings 142 and the female boss fittings 143 to be already in the snapped into position.

In operation, the hinge elements maintain the test tube holder modules 140 attached to each other as the plurality of test tube holder modules 140 are manipulated into a curvilinear arrangement such as when inserted into other container systems like the cylindrical or circular centrifuge bucket 200 that uses a spiral test tube holder assembly configuration or the rectangular centrifuge bucket 300 that uses a switchback test tube holder assembly configuration. The test tube retention performance of the system may be maintained throughout the configuration transition process through the coordinated operation of multiple retention mechanisms within each component module. The magnetic retention systems may continue to provide positioning control for ferromagnetic test tube holder components regardless of the overall system configuration. The ferromagnetic test tube holder components may be utilized to secure assembly 110 to the surfaces of the rack assembly 120, through magnetic attraction to the steel inserts 165 and 160, mechanical retention features may maintain their effectiveness during configuration changes by accommodating the slight positional adjustments that may occur as the articulated joints rotate to new positions. The retention mechanisms may be designed to provide consistent performance characteristics across the full range of articulated positions that may be encountered during normal system operation. At the rear of casing 141 of assembly 110, a relief hole 157 (See FIG. 20) may be added in order to assist with the manufacturing process, including, but not exclusively, SLS manufacturing methods, as seen in FIG. 21B.

Base Assembly

Referring now to FIGS. 22-28, details of the base assembly 115 are provided. The base assembly 115 construction incorporates a modular platform 112 design that provides structural support and precise positioning capabilities for the rack system components. The platform 112 may serve as the primary foundation structure that supports the various subassemblies and provides the mechanical interface for mounting the complete system within laboratory equipment or workstations. The platform 112 may be manufactured from materials that provide appropriate strength characteristics while maintaining dimensional stability under varying temperature and humidity conditions that may be encountered in laboratory environments. The platform 112 design may incorporate mounting features, alignment references, and structural reinforcement elements that facilitate integration with other system components and ensure reliable operation throughout the intended service life of the equipment.

The modular construction approach for the base assembly 115 utilizes three separate substrate sections 126 that may be individually manufactured and subsequently assembled onto the platform 112 during system integration operations. The flange 108 and mounting holes 109 of the three substrate sections 126 may be modified in to adjust fastening points in order to be adapted to the varied deck mounting systems found across liquid handlers from different manufacturers.

Each substrate section 126 may be designed as a discrete structural component that incorporates specific mounting features and component interfaces required for the overall system functionality. The three-section configuration provides manufacturing flexibility by allowing each substrate section 126 to be optimized for its specific functional requirements while maintaining standardized interface characteristics that enable consistent assembly procedures. The substrate sections 126 may be manufactured using 3D printing, injection molding, machining, or other suitable production processes that provide the dimensional accuracy and surface finish characteristics required for proper system operation.

The mounting system for the substrate sections 126 incorporates flanges 108 that provide secure attachment points for connecting each substrate section 126 to the platform 112. Each substrate section 126 may include flanges 108 that extend outward from the main body of the substrate section 126 and provide flat mounting surfaces with predetermined hole patterns for fastener installation. The flanges 108 may be positioned at strategic locations on each substrate section 126 to distribute mounting loads evenly across the platform 112 interface and provide resistance to operational forces that may be transmitted through the substrate sections 126 during system operation. The flange 108 design may incorporate reinforcement features such increased material thickness in areas where higher stress concentrations may occur during normal use conditions.

The fastener system for securing the substrate sections 126 to the platform 112 utilizes through holes 109 that may be present on both the flanges 108 and the platform 112 to create aligned pathways for fastener installation. The through holes 109 may be precisely positioned and sized to accommodate specific fastener types while providing appropriate clearances for assembly operations and thermal expansion characteristics. Fasteners 111 may be inserted through the aligned through holes 109 in the flanges 108 and platform 112 to create secure mechanical connections that maintain the position of each substrate section 126 relative to the platform 112 under various loading conditions. The fastener selection may consider factors such as corrosion resistance, strength characteristics, and compatibility with laboratory cleaning procedures and chemical environments.

The rail system integrated into each substrate section 126 provides the primary interface mechanism for receiving and supporting the rack assemblies during operation. Each substrate section 126 may include substrate channels 104 that are formed as integral features of the substrate section 126 structure and are specifically sized and positioned for receipt of the rails 125. The substrate channels 104 may be manufactured with precise dimensional control to ensure proper fit and alignment of the rails 125 while allowing for controlled insertion and removal operations during assembly and maintenance procedures. The channel geometry may incorporate features such as retention lips, alignment surfaces, or clearance areas that optimize the rail installation process and provide secure positioning once the rails 125 are properly seated within the substrate channels 104.

The rail mounting system within the substrate channels 104 may provide both positioning and retention capabilities that maintain the rails 125 in their proper locations throughout the operational life of the system. The substrate channels 104 may be designed with internal geometry that creates mechanical interference or positive locking features with corresponding features on the rails 125 to prevent displacement during normal use conditions. The channel design may also accommodate thermal expansion characteristics of both the substrate sections 126 and the rails 125 to prevent binding or excessive stress concentrations that could affect system performance or component longevity.

The front end 117 configuration of the base assembly 115 incorporates a holder plate 180 that provides specialized functionality for system operation and user interface requirements. The holder plate 113 may be positioned at the front end of the base assembly 115 and may serve as a structural component that integrates with the overall platform 112 design while providing specific features required for rack insertion and positioning operations. The holder plate 113 may be manufactured as a separate component that is assembled to the platform 112 during system construction, or the holder plate 113 may be formed as an integral feature of the platform 112 structure depending on manufacturing considerations and functional requirements.

The holder plate 113 incorporates holder plate grooves 114 that provide guidance and positioning features for components that interface with the front end of the base assembly 115. The holder plate grooves 114 may be formed as recessed channels or slots that extend into the surface of the holder plate 113 and provide controlled pathways for component insertion or positioning operations. The groove geometry may be precisely controlled to accommodate specific component dimensions while providing appropriate clearances for smooth operation and accommodation of manufacturing tolerances. The holder plate grooves 114 may be positioned at predetermined locations across the holder plate 113 surface to create organized arrays or patterns that correspond to the spacing and arrangement of other system components; namely the lateral position points for rack insertion.

The end stop and insertion assistance system for the base assembly 115 incorporates triangular shaped guides 116 that may be positioned on the distal ends of the grooves 114 in the holder plate 113 to facilitate smooth and accurate insertion of racks 120 into the channels while also acting as an end stop to ensure the rack 120 is not inserted past the intended point through their respective rails. The triangular shaped end stops and guide 116 may be manufactured as separate components that are attached to the holder plate 113 during assembly operations, or the end stops and guide triangles 116 may be formed as integral features of the holder plate 113 structure during the manufacturing process. The guides 116 may operate in pairs so that the sides of two corresponding end stops and guide triangle 116 cooperate to direct the end of the rack rail 130 into a channel 128 between the two cooperating guides 116, while also acting as an end stop to stop racks 120 from moving past the intended position in their respective rails 125. The triangular geometry of the guides 116 provides tapered leading surfaces that contact the incoming racks 120 and provide gradual alignment forces that guide the racks 120 into proper position within the channels 128. Additionally, these triangular pairs act as an end stop for the insertion of the racks 120, aligning with the angled wider base 123 footprint (See FIG. 6 and FIG. 15) of 124A in rack assembly 120. The triangular shape may be optimized to provide effective guidance characteristics while minimizing insertion forces and reducing the potential for binding or misalignment during rack installation operations.

The positioning and orientation of the triangular shaped guides 116 may be carefully controlled to ensure consistent performance across all rack rail 130 positions within the base assembly 115. Each pair of end stop and guide triangles 116 may be positioned at a specific location on the front end of its corresponding base rails 125 to ensure the rack assembly 120 is inserted a specific and consistent position across the length of these base rails. The end stop and guide triangles 116 surfaces may be manufactured with smooth finishes and appropriate material selections that minimize friction and wear during repeated insertion and removal cycles while maintaining their guidance effectiveness throughout the service life of the system.

The rear end 118 of the base assembly 115 may include a plurality of spring loaded ball bearings 107 that are positioned behind the ends of respective base channels 128. See FIGS. 22 and 24-26. The bearings 107 may be positioned within pockets 106 that are present in the rear end 118. The bearings 107 may have a cylindrical body with a spherical head (which can be seen in FIG. 25). As may be appreciated, the bearings 107 add slight vertical pressure against the bottom of the rack assemblies when inserted across the full length of the rail 125, in order to hold the inserted rack stably in the end position, during operation. Additionally, this added friction at the end of rack insertion and the beginning of rack removal may provide a tactile sensation for the user, signifying the rack 120 is in the fully loaded position.

As may be appreciated, the base assembly construction incorporates a modular platform design that provides structural support and precise positioning capabilities for the rack system components. The platform 112 may serve as the primary foundation structure that supports the various subassemblies and provides the mechanical interface for mounting the complete system within laboratory equipment or workstations. The platform 112 may be manufactured from materials that provide appropriate strength characteristics while maintaining dimensional stability under varying temperature and humidity conditions that may be encountered in laboratory environments. The platform 112 design may incorporate mounting features, alignment references, and structural reinforcement elements that facilitate integration with other system components and ensure reliable operation throughout the intended service life of the equipment.

The modular construction approach for the base assembly 115 utilizes three separate substrate sections 126 that may be individually manufactured and subsequently assembled onto the platform 112 during system integration operations. Each substrate section 126 may be designed as a discrete structural component that incorporates specific mounting features and component interfaces required for the overall system functionality. The three-section configuration provides manufacturing flexibility by allowing each substrate section 126 to be optimized for its specific functional requirements while maintaining standardized interface characteristics that enable consistent assembly procedures. The substrate sections 126 may be manufactured using injection molding, machining, or other suitable production processes that provide the dimensional accuracy and surface finish characteristics required for proper system operation.

The mounting system for the substrate sections 126 incorporates flanges 108 that provide secure attachment points for connecting each substrate section 126 to the platform 112. Each substrate section 126 may include flanges 108 that extend outward from the main body of the substrate section 126 and provide flat mounting surfaces with predetermined hole patterns for fastener installation. The flanges 108 may be positioned at strategic locations on each substrate section 126 to distribute mounting loads evenly across the platform interface and provide resistance to operational forces that may be transmitted through the substrate sections during system operation.

The fastener system for securing the substrate sections 126 to the platform 112 utilizes through holes 109 that may be present on both the flanges 108 and the platform 112 to create aligned pathways for fastener installation. The through holes 109 may be precisely positioned and sized to accommodate specific fastener types while providing appropriate clearances for assembly operations and thermal expansion characteristics. Fasteners 111 may be inserted through the aligned through holes 109 in the flanges 108 and platform 112 to create secure mechanical connections that maintain the position of each substrate section 126 relative to the platform 112 under various loading conditions. The fastener section flanges 108 and holes 109 of assembly 119 may be modified to accommodate different mounting systems and platforms, in order to allow compatibility across different types and brands of liquid handlers. The fastener selection may consider factors such as corrosion resistance, strength characteristics, and compatibility with laboratory cleaning procedures and chemical environments.

The rail system integrated into each substrate section 126 provides the primary interface mechanism for receiving and supporting the rack 120 assemblies during operation. Each substrate section 126 may include substrate channels 104 that are formed as integral features of the substrate section 126 structure and are specifically sized and positioned for receipt of the rails 125. The substrate channels 104 may be manufactured with precise dimensional control to ensure proper fit and alignment of the rails while allowing for controlled insertion and removal operations during assembly and maintenance procedures. The channel geometry may incorporate features such as retention lips, alignment surfaces, or clearance areas that optimize the rail installation process and provide secure positioning once the rails are properly seated within the substrate channels 104.

The rail mounting system within the substrate channels 104 may provide both positioning and retention capabilities that maintain the rails 125 in their proper locations throughout the operational life of the system. The substrate channels 104 may be designed with internal geometry that creates mechanical interference or positive locking features with corresponding features on the rails to prevent displacement during normal use conditions. The channel design may also accommodate thermal expansion characteristics of both the substrate sections 126 and the rails 125 to prevent binding or excessive stress concentrations that could affect system performance or component longevity.

The front end configuration of the base assembly 115 incorporates a holder plate 113 that provides specialized functionality for system operation and user interface requirements. The holder plate 113 may be positioned at the front end 117 of the base assembly 115 and may serve as a structural component that integrates with the overall platform design while providing specific features required for rack insertion and positioning operations. The holder plate 113 may be manufactured as a separate component that is assembled to the platform during system construction, or the holder plate 113 may be formed as an integral feature of the platform structure depending on manufacturing considerations and functional requirements.

The end stop and insertion assistance system for the base assembly 115 incorporates triangular shaped guides 116 that may be positioned to ensure rack assemblies 120 do not move past their intended end position in their respective rails 125, while also helping to facilitate smooth and accurate insertion of rack rails 130 into the channels 128. The triangular geometry of the guides 116 provides tapered leading surfaces that contact the incoming racks 120 and provide gradual alignment forces that guide the racks 120 into proper position within the channels 128. The triangular shape may be optimized to provide effective guidance characteristics, however should be aligned with the angled wider base 123 portion of rack assembly 120, while minimizing insertion forces and reducing the potential for binding or misalignment during rack installation operations.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The invention claimed is:

1. A test tube holder assembly for a liquid handler rack system, the test tube holder assembly comprising:
- a rack including a plate;
- a plurality of test tube holder modules, each test tube holder module configured to detain a test tube, wherein each test tube holder module includes:
  - a casing;
  - a compartment in the casing for receiving a corresponding test tube;
  - a magnet housed by the casing and positioned to magnetically attract the plate and secure the corresponding test tube holder module on the rack; and
  - a plurality of connection elements, each connection element coupling a first test tube holder module to a second test tube holder.

2. The assembly of claim 1, wherein each test holder module of the plurality of test tube holder modules includes a magnet seat and a magnet cap, wherein the magnet is housed on top of the magnet seat and covered by the magnet cap and the compartment is configured to hold the corresponding test tube on top of the magnet cap.

3. The assembly of claim 1, wherein each connection element of the plurality of connection elements is configured to articulate a first test tube holder module relative to a second test tube holder module.

4. The assembly of claim 1, wherein each connection element of the plurality of connection elements is a hinge element on a sidewall of a casing of a corresponding test tube holder module.

5. The assembly of claim 4, wherein the hinge element comprises a knuckle having a male boss fitting and female boss fitting configured to interlock with a corresponding first fitting and a corresponding second fitting on an adjacent test tube holder module to enable rotation of a respective first test tube holder module relative to a respective second test tube holder module.

6. The assembly of claim 4, wherein the plurality of hinge elements is configured to maintain the plurality of test tube holder modules attached to enable the plurality of test tube holder modules to be manipulated into a curvilinear arrangement.

7. The assembly of claim 4, wherein the plurality of hinge elements include a plurality of knuckles, each knuckle positioned at a different vertical level on sidewalls of the casing to permit rotational articulation between two adjacent test tube holder modules.

8. The assembly of claim 5, wherein the male boss fitting and female boss fitting are configured to form a pivoting connection between two adjacent test tube holder modules by snaping together.

9. The assembly of claim 5, wherein each casing includes at least two knuckles on a first sidewall and at least two knuckles on a second sidewall opposing the first sidewall the at least two knuckles on the first sidewall configured to interlock with at least two knuckles of a corresponding knuckle of an adjacent test tube holder module.

10. The assembly of claim 4, wherein the plurality of hinge elements permit relative rotation between two adjacent test tube holder modules through an angular range of approximately 0 degrees to 100 degrees.

11. The assembly of claim 3, wherein the plurality of connection elements enable the plurality of test tube holder modules to form a flexible chain capable of conforming to curved paths.

12. The assembly of claim 11, wherein the flexible chain is configurable into a spiral arrangement for placement within a circular centrifuge bucket.

13. The assembly of claim 11, wherein the flexible chain is configurable into a switchback arrangement for placement within a rectangular centrifuge bucket.

14. The assembly of claim 1, wherein each casing includes a front side having a window configured to permit visual inspection of a corresponding test tube positioned within the compartment.

15. The assembly of claim 1, wherein each casing includes an open backside defined by a pair of clamp edges configured to permit insertion and removal of the test tube into the compartment.

16. The assembly of claim 15, further comprising a leaf spring positioned within the casing and configured to apply a retention force against the corresponding test tube.

17. The assembly of claim 1, wherein the plurality of test tube holder modules are removably mountable to the rack through magnetic attraction between the magnet and the plate.

18. The assembly of claim 1, wherein the plurality of test tube holder modules are configured to maintain a relative spacing between adjacent test tubes when the modules are articulated.

19. The assembly of claim 1, wherein the plate is a grating.

20. The assembly of claim 19, wherein the grating defines a plurality of prongs.

21. A method of using the test tube holder assembly of claim 1, the method comprising:

- inserting a test tube into the compartment of each test tube holder module of the plurality of test tube holder modules;
- positioning the plurality of test tube holder modules on the rack such that the magnet of each test tube holder module magnetically attract the plate and secure the respective test tube holder module on the rack; and
- maintaining each test holder module coupled to an adjacent test holder module by the corresponding connection elements.

22. The method of claim 19, further comprising articulating a first test tube holder module relative to a second test tube holder module through the respective connection elements of the first test tube holder and of the second test tube holder.

23. The method of claim 20, further comprising manipulating the plurality of test tube holder modules into a curvilinear arrangement with the each test tube holder module attached to an adjacent test tube holder module.

* * * * *